(12) United States Patent
Shiokawa et al.

(10) Patent No.: US 12,265,590 B1
(45) Date of Patent: Apr. 1, 2025

(54) SYSTEMS AND METHODS FOR ENHANCING PERFORMANCE OF SEARCH ENGINES

(71) Applicant: FMR LLC, Boston, MA (US)

(72) Inventors: Hotaka Shiokawa, Waltham, MA (US); Hui Su, West Roxbury, MA (US); Hamed Shahbazi, Norwood, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/742,418

(22) Filed: Jun. 13, 2024

(51) Int. Cl.
   *G06F 7/00* (2006.01)
   *G06F 16/957* (2019.01)
   *G06F 40/295* (2020.01)

(52) U.S. Cl.
   CPC ........ *G06F 16/9574* (2019.01); *G06F 40/295* (2020.01)

(58) Field of Classification Search
   CPC ............................ G06F 16/9574; G06F 40/295
   USPC .................................................. 707/600–899
   See application file for complete search history.

(56) References Cited

U.S. PATENT DOCUMENTS

2016/0147765 A1* 5/2016 Glover ...................... G06F 8/60
                                                    707/723

OTHER PUBLICATIONS

Mikolov, Tomas et al, Efficient Estimation of Word Representations in Vector Space, Sep. 7, 2013, 12 pages.
Pennington, Jeffrey et al, GloVe: Global Vectors for Word Representation, Proceedings of the 2014 Conference on Empirical Methods in Natural Language Processing (EMNLP), Oct. 25-29, 2014, pp. 1532-1543, Doha, Qatar.

* cited by examiner

*Primary Examiner* — Isaac M Woo
(74) *Attorney, Agent, or Firm* — Cesari and McKenna, LLP

(57) ABSTRACT

Systems and methods are described for enhancing performance of a search engine by using pre-existing fine-tuned machine learning models that include domain-specific knowledge. A computing device receives search results from a search engine based on a query, in which the search results include chunk identifiers and a first weight score associated with each chunk identifier. The computing device further determines a subset of search results, which includes a first predetermined number of top-ranked chunk identifiers in the search results. The computing device generates, for each chunk identifier in the subset of search results, one or more second weight scores. Then the computing device generates, via a machine learning model, ensemble scores for the chunk identifiers. Afterwards, the computing device determines a second predetermined number of top-ranked chunk identifiers based on the ensemble scores.

22 Claims, 13 Drawing Sheets

*Original Chunk Text:*

1.07 DEFERRAL CONTRIBUTIONS
(2) ^ Additional Deferral Contributions – The Employer shall allow a Participant upon proper notice and approval to enter into a special salary reduction agreement to make additional Deferral Contributions in an amount up to 100% of their effectively available Compensation for the payroll period(s) designated by the Employer.

*NER Output:*

1.07, Bullet, deferral, Deferral, deferral contributions, Contribution, deferral, Deferral, deferral contributions, Contribution, deferral contributions -employer, Employer, participant, Participant, participant, Employee, salary reduction agreement, Agreement, deferral, Deferral, deferral contributions, Contribution, 100%, Percentage, compensation, Compensation, payroll period, Date, payroll period, Period, employer, Employer

*Final text to be embedded (words are deduplicated an sorted by frequency):* deferral, Deferral, deferral contributions, Contribution, Employer, participant, payroll period, 1.07, Bullet, deferral contributions -employer, Participant, Employee, salary reduction agreement, Agreement, 100%, Percentage, compensation, Compensation, Date, Period, employer

FIG. 3A

Before summarization:

1.07 DEFERRAL CONTRIBUTIONS
(B) ^ Unless otherwise elected in Subsection 1.07(a)(6)(B)(i)(IV) below, all such Employees who have never had a Deferral Contribution election in place.

After summarization:

(B) All such Employees who have never had a Deferral Contribution election in place.

FIG. 3B

SYSTEMS AND METHODS FOR ENHANCING PERFORMANCE OF SEARCH ENGINES

TECHNICAL FIELD

This application relates generally to systems and methods, including computer program products, for enhancing the performance of search engines.

BACKGROUND

Computing systems can utilize communication networks to exchange data. In some implementations, a computing system can receive and process data provided by another computing system. For example, a computing system can receive data entered using another computing system, store the data, process the data, and so on. Some computing systems execute interactive or unattended applications in which data is processed or other operations are performed in response to user requests or other events.

Some computing systems may operate or include therein search engines, which have become ubiquitous in the modern day. In fact, it is a common routine for users to search for various types of information or content via search engines. For example, utilizing a computing device, users may submit queries for such content to a search engine. In response, the search engine may return one or more search results that are ranked according to how relevant they are to the user's query. However, the search results returned by the search engine may not always be ranked correctly. In other words, the content which most accurately matches the query may not always be at the top of the list of search results. In fact, the content may be ranked at the lower end of the list, thereby possibly causing the user to miss the content (as users are prone to looking at only the first few results). This problem can be solved by fine-tuning the search engine to increase its accuracy. However, it may take a large amount of time and effort in fine-tuning the search engine. Further, it may not be possible to fine-tune the search engine if it is proprietary or licensed. As such, there remains a need to improve the performance of search engines.

SUMMARY

Therefore, what is needed are systems and methods for enhancing the performance of search engines in order to provide more accurate search results in connection with a query provided by a user. As described herein, the techniques advantageously provide for improvement of search engines (or search frameworks) without the need to modify them (e.g., maintain their current configuration without any changes made thereto). Another advantage that is provided by the present disclosure is that the present system described herein renders it unnecessary to fine-tune an LLM used in the present system in order to incorporate domain specific knowledge. In other words, the present system allows usage of pre-existing fine-tuned machine learning models (e.g., Transformer-based models) that may include domain specific knowledge in improving the search engines or search frameworks.

The present disclosure, in one aspect, features a system for enhancing performance of a search engine, the system comprising a server computing device having a memory for storing computer executable instructions and a processor that executes the computer executable instructions. The computing device receives search results from a search engine based on a query, in which the search results include chunk identifiers and a first weight score associated with each chunk identifier, wherein each chunk identifier corresponds to a chunk and one or more modified chunks, and wherein each of the one or more modified chunks are modified according to a different alteration technique; determines a subset of search results, which includes a first predetermined number of top-ranked chunk identifiers in the search results that are determined by the search engine to be the most relevant to the query; generates, for each chunk identifier in the subset of search results, one or more second weight scores based on an embedding of the query and embeddings of the one or more modified chunks corresponding to the chunk identifier, wherein a second weight score is generated for each modified chunk associated with the chunk; generates, via a machine learning model, ensemble scores for the chunk identifiers, wherein each ensemble score for a chunk identifier is determined based on the first weight score, the one or more second weight scores, and trainable weights of the machine learning model; and determines a second predetermined number of top-ranked chunk identifiers based on the ensemble scores, wherein the second predetermined number is less than the first predetermined number.

The computing device, during a preprocessing stage, generates, for each chunk in a chunk database, one or more modified chunks according to one or more alteration techniques; and generates, for each of the one or more modified chunks, an embedding of a corresponding modified chunk, wherein the embedding is stored in an embedding database. The computing device, during a preprocessing stage, determines, for each chunk in a chunk database, whether a total number of sentences in the chunk exceed a predetermined threshold; determines that a first chunk in the chunk database includes a total number of sentences that exceed the predetermined threshold; and divides a total number of sentences in the first chunk into a plurality of sentence sets, in which each sentence set includes one or more sentences. The computing device, during a preprocessing stage, modifies each of the sentence sets according to one or more types of alteration techniques to generate one or more modified sentence sets, in which each modified sentence set is grouped together into modified sentence groups based on the type of alteration technique used to generate the modified sentence set; and generates an embedding for each of the one or more modified sentence sets, wherein the embedding associated with each of the one or more modified sentence sets is stored in an embedding database. The computing device determines, when generating the one or more second weight scores, that a second chunk corresponding to a chunk identifier in the subset of search results is divided into one or more sentence sets; and generates one or more second weight scores for the second chunk, in which each of the second weight scores corresponds to a modified sentence group, the second weight score for each modified sentence group being generated by: determining a preliminary score for each modified sentence set in the modified sentence group; and selecting the preliminary score of a modified sentence set that has the highest value, wherein each preliminary score is generated based on the embedding of the query and an embedding of a corresponding modified sentence set. A user utilizes a search application on a computing device to generate the query for the search engine, and wherein the search application returns the search results to the user, in which the search application displays chunks corresponding to the second predetermined number of top-ranked chunk identifiers. At least one of the one or more alteration techniques is a named entity recognition (NER) technique, in which a large language model (LLM) uses the NER technique to generate an NER output that includes a list of one or more words that are determined to be named entities according to predetermined categories. The computing device modifies the NER output by removing duplicates of the one or more words and arranging the one or more words according to their frequency; and embed the modified NER output. At least one of the one or more alteration techniques is a summarization technique, in which a large language model (LLM) is used to generate a summary of text. The search engine uses a Haystack framework to perform a search, and wherein the first weight scores are Haystack scores. The measurement function is used to determine the one or more second weight scores. The measurement function is at least one of cosine similarity, Euclidean distance, Jaccard distance, Manhattan distance, and Minkowski distance.

The present disclosure, in another aspect, features a computerized method of enhancing performance of a search engine. The method comprises receiving search results from a search engine based on a query, in which the search results include chunk identifiers and a first weight score associated with each chunk identifier, wherein each chunk identifier corresponds to a chunk and one or more modified chunks, and wherein each of the one or more modified chunks are modified according to a different alteration technique; determining a subset of search results, which includes a first predetermined number of top-ranked chunk identifiers in the search results that are determined by the search engine to be the most relevant to the query; generating, for each chunk identifier in the subset of search results, one or more second weight scores based on an embedding of the query and embeddings of the one or more modified chunks corresponding to the chunk identifier, wherein a second weight score is generated for each modified chunk associated with the chunk; generating, via a machine learning model, ensemble scores for the chunk identifiers, wherein each ensemble score for a chunk identifier is determined based on the first weight score, the one or more second weight scores, and trainable weights of the machine learning model; and determining a second predetermined number of top-ranked chunk identifiers based on the ensemble scores, wherein the second predetermined number is less than the first predetermined number. The method comprises generating, for each chunk in a chunk database, one or more modified chunks according to one or more alteration techniques; and generating, for each of the one or more modified chunks, an embedding of a corresponding modified chunk, wherein the embedding is stored in an embedding database. The method comprises determining, for each chunk in a chunk database, whether a total number of sentences in the chunk exceed a predetermined threshold; determining that a first chunk in the chunk database includes a total number of sentences that exceed the predetermined threshold; and dividing a total number of sentences in the first chunk into a plurality of sentence sets, in which each sentence set includes one or more sentences. The method comprises modifying each of the sentence sets according to one or more types of alteration techniques to generate one or more modified sentence sets, in which each modified sentence set is grouped together into modified sentence groups based on the type of alteration technique used to generate the modified sentence set; and generating an embedding for each of the one or more modified sentence sets, wherein the embedding associated with each of the one or more modified sentence sets is stored in an embedding database. The method comprises determine, when generating the one or more second weight scores, that a second chunk corresponding to a chunk identifier in the subset of search results is divided into one or more sentence sets; and generate one or more second weight scores for the second chunk, in which each of the second weight scores corresponds to a modified sentence group, the second weight score for each modified sentence group being generated by: determining a preliminary score for each modified sentence set in the modified sentence group; and selecting the preliminary score of a modified sentence set that has the highest value, wherein each preliminary score is generated based on the embedding of the query and an embedding of a corresponding modified sentence set. A user utilizes a search application on a computing device to generate the query for the search engine, and wherein the search application returns the search results to the user, in which the search application displays chunks corresponding to the second predetermined number of top-ranked chunk identifiers. At least one of the one or more alteration techniques is a named entity recognition (NER) technique, in which a large language model (LLM) uses the NER technique to generate an NER output that includes a list of one or more words that are determined to be named entities according to predetermined categories. The method comprises modifying the NER output by removing duplicates of the one or more words and arranging the one or more words according to their frequency; and embedding the modified NER output. At least one of the one or more alteration techniques is a summarization technique, in which a large language model (LLM) is used to generate a summary of text. The search engine uses a Haystack framework to perform a search, and wherein the first weight scores are Haystack scores. The measurement function is used to determine the one or more second weight scores. The measurement function is at least one of cosine similarity, Euclidean distance, Jaccard distance, Manhattan distance, and Minkowski distance.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3A is a diagram of an exemplary chunk and its corresponding modification after it has been modified according to a named-entity alteration technique.

FIG. 3B is an example of an exemplary chunk and its corresponding modification after it has been modified according to a summarization technique.

DETAILED DESCRIPTION

Figure 1:
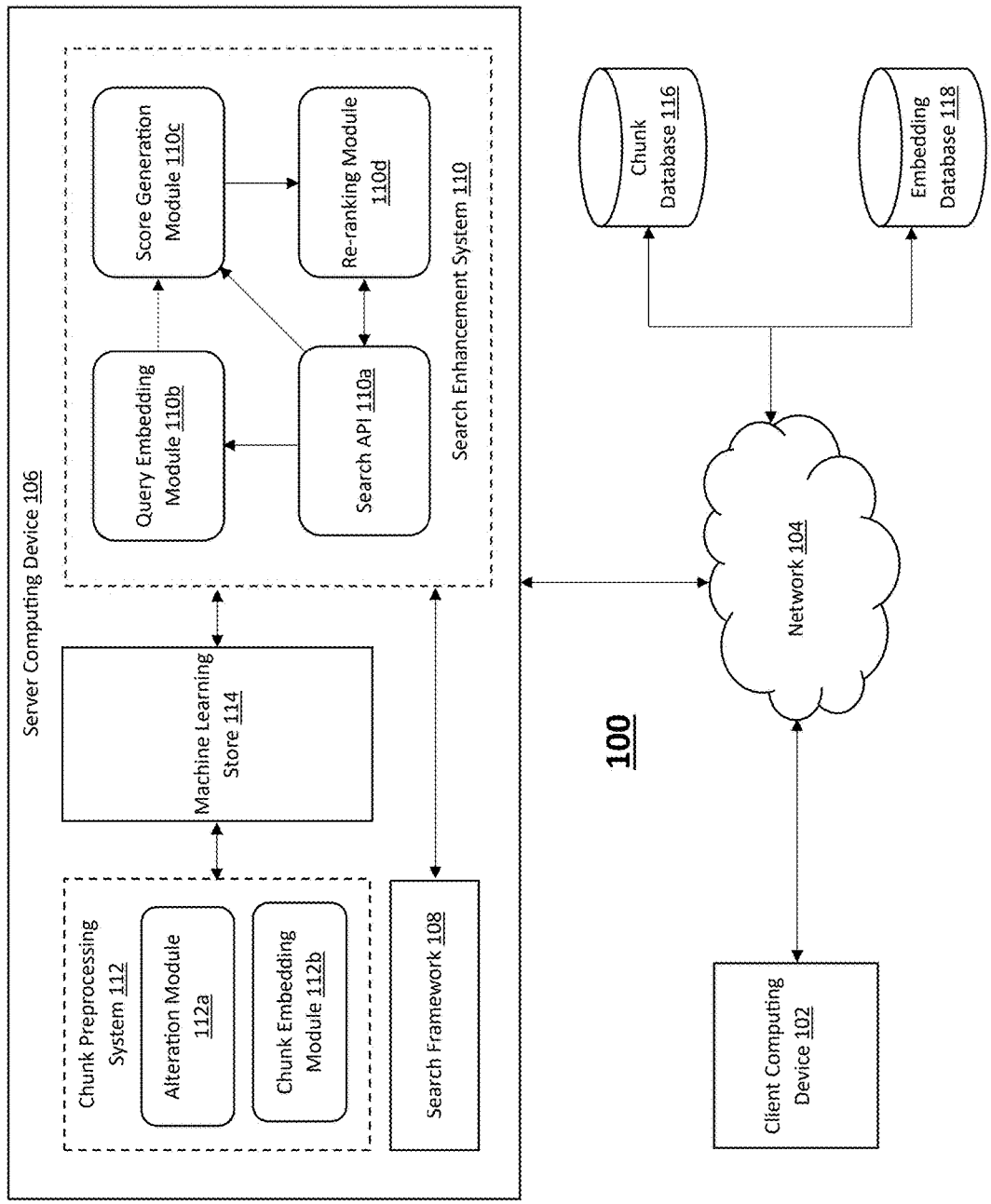
FIG. 1 is a block diagram of a system for enhancing the performance of a search engine.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein.

FIG. 1 is a block diagram of a system for 100 for enhancing performance of a search engine. System 100 includes a client computing device 102, communication network 104, server computing device 106, a chunk database 116, and an embedding database 118.

The client computing device 102 can be coupled to a display device (not shown), such as a monitor, display panel, or screen. For example, client computing device 102 can provide a graphical user interface (GUI) via the display device to a user of corresponding device that presents output resulting from the methods and systems described herein and receives input from the user for further processing. Exemplary client computing device 102 include but are not limited to desktop computers, laptop computers, tablets, mobile devices, smartphones, smart watches, Internet-of-Things (IoT) devices, and internet appliances. It should be appreciated that other types of client computing devices that are capable of connecting to components of the system 100 can be used without departing from the scope of invention. Although FIG. 1 depicts a single client computing device 102, it should be appreciated that system 100 can include any number of client computing devices 102.

Communication network 104 allows the server computing device 106 to communicate with the chunk database 116 and the embedding database 118, and one or more other remote computing devices (not shown). In some embodiments, client computing device 102 is similarly connected to the network 104 in order to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to transmit data to other components of the system 106, to receive data from other components of the system 100, and perform functions for enhancing performance of a search engine, as described herein. The server computing device 106 includes several systems, frameworks, stores, and computing modules that execute on one or more processors of the server computing device 106. For example, the server computing device 106 includes a search framework 108, a search enhancement system 110, a chunk preprocessing system 112, and a machine learning store 114 (which can store all types of machine learning models, such as classification type machine learning model(s), regression type machine learning model(s), support vector machines (SVM) machine learning model(s), ensemble method machine learning model(s), neural network model(s), deep learning model(s), or (large) language model(s)). The search enhancement system 110 includes a search application programming interface (API) 110*a*, a query embedding module 110*b*, a score generation module 110*c*, and a re-ranking module 110*d*. The chunk preprocessing system 112 includes an alteration module 112*a* and a chunk embedding module 112*b*. In some embodiments, search framework 108, search API 110*a*, query embedding module 110*b*, score generation module 110*c*, re-ranking module 110*d*, alteration module 112*a*, chunk embedding module 112*b*, machine learning store 114, are specialized sets of computer software instructions programmed onto one or more dedicated processors in server computing device 106 and can include specifically-designated memory locations and/or registers for executing the specialized computer software instructions.

Although search framework 108, search API 110*a*, query embedding module 110*b*, score generation module 110*c*, re-ranking module 110*d*, alteration module 112*a*, chunk embedding module 112*b*, machine learning store 114 are shown in FIG. 1 as executing within the same server computing device 106, in some embodiments the functionality of search framework 108, search API 110*a*, query embedding module 110*b*, score generation module 110*c*, re-ranking module 110*d*, alteration module 112*a*, chunk embedding module 112*b*, machine learning store 114 can be distributed among a plurality of server computing devices. As shown in FIG. 1, the server computing device 106 allows search framework 108, search API 110*a*, query embedding module 110*b*, score generation module 110*c*, re-ranking module 110*d*, alteration module 112*a*, chunk embedding module 112*b*, machine learning store 114 to communicate with each other in order to exchange data for the purpose of performing the described functions. It should be appreciated that any number of computing devices, arranged in a variety of architectures, resources, and configurations (e.g., cluster computing, visual computing, cloud computing) can be used without departing from the scope of the invention. Exemplary functionality of search framework 108, search API 110*a*, query embedding module 110*b*, score generation module 110*c*, re-ranking module 110*d*, alteration module 112*a*, chunk embedding module 112*b*, machine learning store 114 are described in detail below.

Generally, in the system 100, a client computing device 102, may include one or more applications that provide additional functionality to the client computing device 102. For example, the client computing device 102 may include a search application that allows the client computing device 102 to access searching services (or other services) provided by the server computing device 106. In another example, the client computing device 102 may include a browser application that allows access to the searching services (or other services) provided by the server computing device 106 via a website, which can be reached by entering a uniform resource locator (URL).

As such, a user of the client computing device 102 may perform a search by inputting a query into the search application or into a form provided by a webpage. After the query is input by the user, the client computing device 102 transmits the query to the server computing system 106. The query is received by the search API 110*a*, which transmits the query to the search framework 108. The search framework 108 may include a search engine that generates one or more search results from the query by accessing the chunk database 116. The search results are arranged in a first sequential order, in which each search result is ranked by how relevant the search engine determines it is to the query. After generating the search results, the search framework 108 transmits the search results to the search API 110*a*. The search API 110*a* determines a first subset of the search results that are to be re-ranked based on a predetermined number (e.g., top 10 search results, top 20 search results, top 30 search results), and transmits such subset of search results to the search API 110*a*.

Next, the search enhancement system 110 performs a re-ranking of the first subset of search results. The re-ranking is achieved by generating one or more weight scores (using the score generation module 110*c*) that are used as input into the re-ranking module 110*d*. The re-ranking module 110*d* has access to machine learning models, which are stored in the machine learning store 114. As such, the re-ranking module 110*d* may use machine learning techniques to perform re-ranking of the first subset of search results. The first subset of search results is re-ranked according to a second sequential order, in which each search result is ranked by how relevant the re-ranking module 110*d* determines it is to the query. Afterwards, the re-ranking module 110*d* transmits the re-ranked first subset of search results to the search API 110*a*. In turn, the search API 110*a* generates a second subset of search results, which include a predetermined number of top-ranked search results in the first subset of search results (e.g., top 3 search results, top 5 search results). Then, the search API 110*a* transmits the second subset of search results to the client computing device 102, which displays the second subset of search results to the user via, for example, the browser or search application disposed on the client computing device 102.

Example Routine for Preprocessing Chunks

Figure 13:
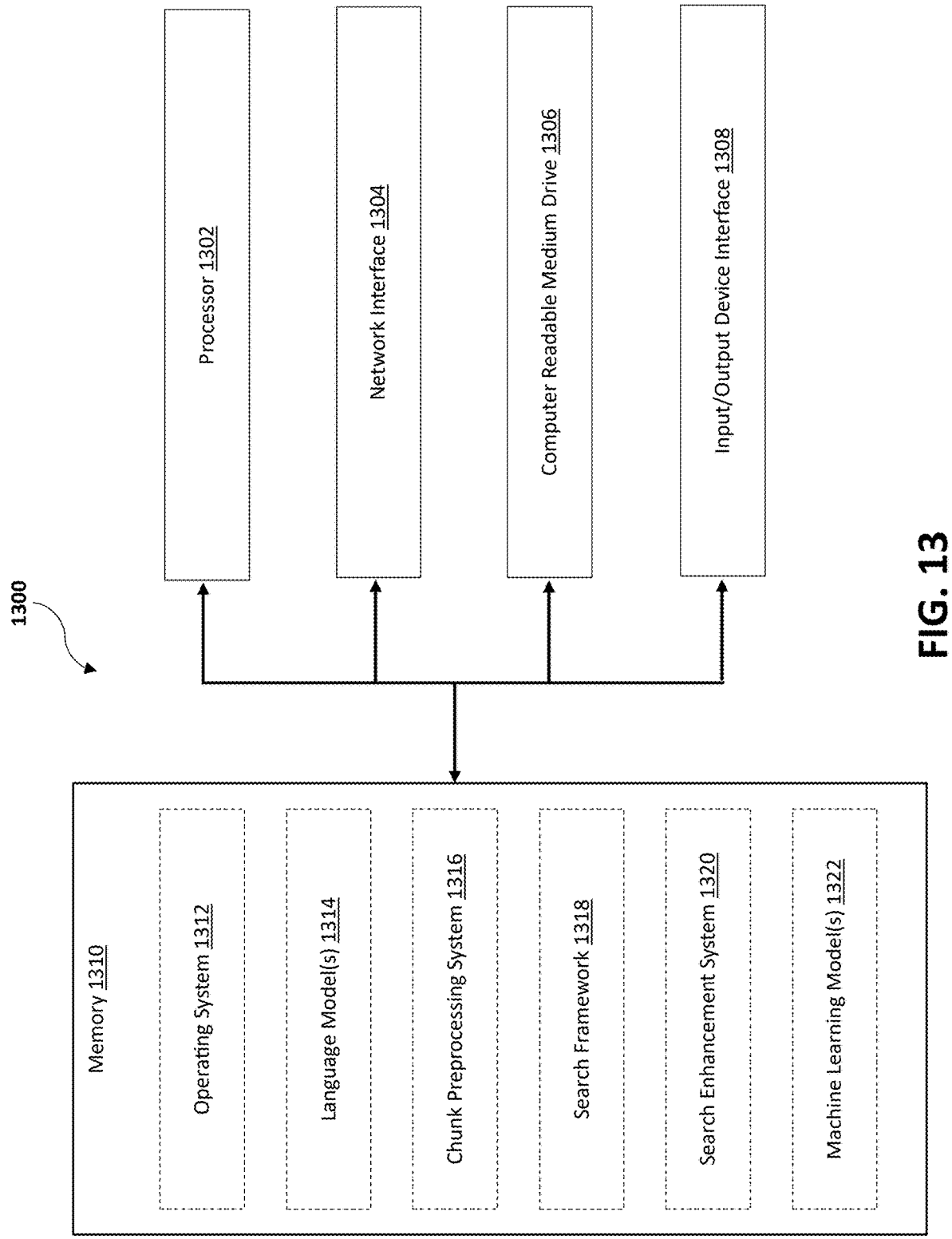
FIG. 13 is a diagram of an illustrative computing system.

When a routine described herein (i.e., 200, 400, 500, 600, 700, 900, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300 shown in FIG. 13, and executed by one or more processors. In some embodiments, the routine 200, 400, 500, 600, 700, 900 and 1100, or portions thereof may be implemented on multiple processors, serially or in parallel.

Figure 2:
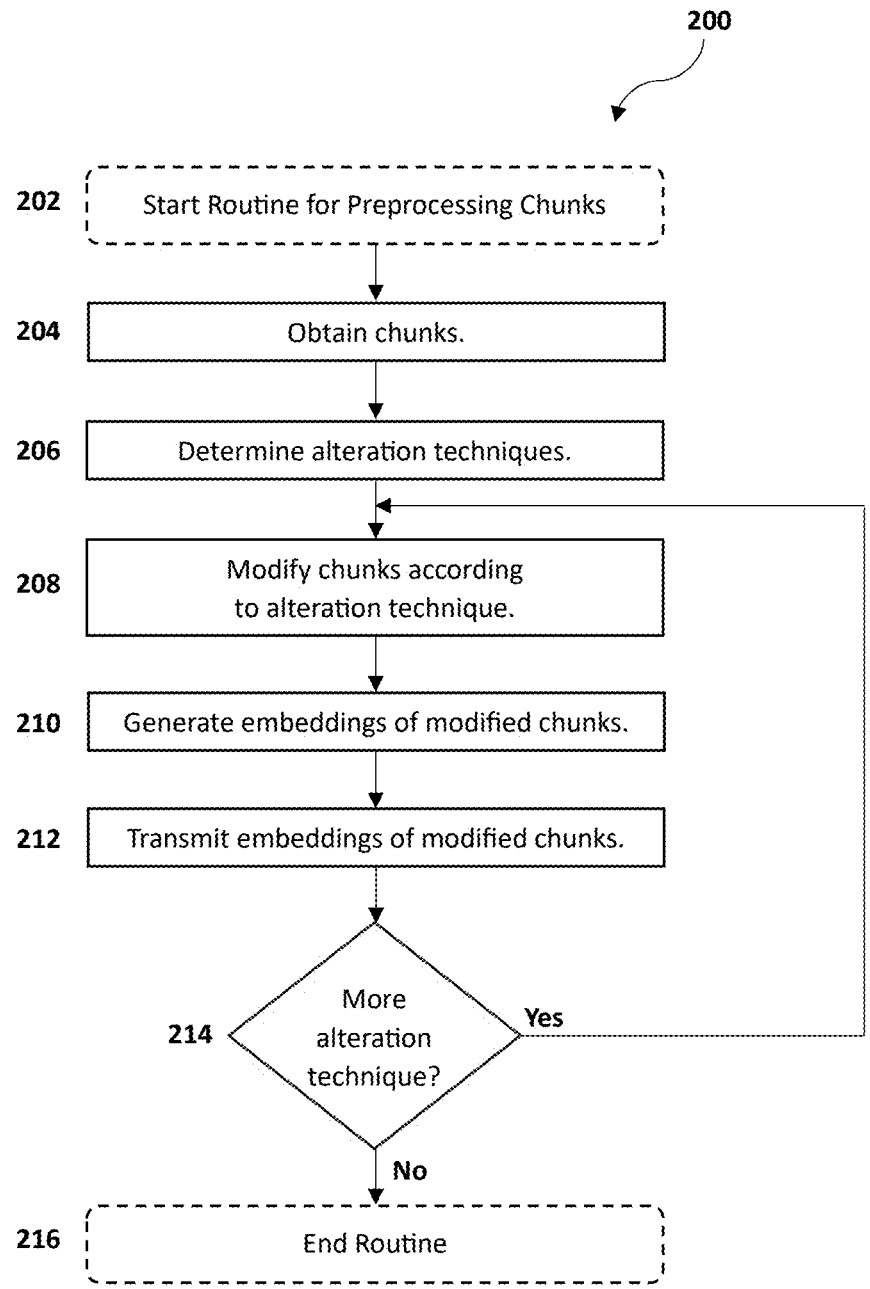
FIG. 2 is a flow diagram of a computerized method for preprocessing chunks.

FIG. 2 illustrates example routine 200 (beginning at block 202) for preprocessing chunks, that is performed, for example, by the chunk preprocessing system 112.

Chunks, as used herein, may refer to content of any type including, but not limited to, audio information (e.g., music, podcasts, radio), video information (e.g., TV series, movies), image information (e.g., photographs), text (e.g., documents, articles, books), and websites (e.g., webpages). In some embodiments, the chunks may also be pieces, portions, or sections of content. For example, an electronic book may be divided into chapters. As such, a chunk may be generated for each chapter in the electronic book and assigned a unique chunk identifier. In another example, a legal code (e.g., 35 U.S.C.) may be divided into sections, subsections, paragraphs, subparagraphs, clauses, subclauses, items, and subitems. As such a chunk may be generated on any of the aforementioned types of divisions. It should be noted that the chunk may not necessarily be based on inherent divisions (e.g., book chapters) in the content, but can be based on any desired division of content (e.g., chunk represents every sentence or paragraph of a webpage). Chunks may be stored in the chunk database 116. In addition, the chunks stored in the chunk database 116 may also be associated with a unique chunk identifier (e.g., alphanumeric indicator) that identifies (and is unique to) the chunk.

At block 204, the chunk preprocessing system 112 obtains one or more chunks from the chunk database 116. For example, the chunk preprocessing system 112 may communicate with the chunk database 116 over the network 104 to obtain copies of the chunks therein. At block 206, the chunk preprocessing system 112 determines one or more alteration techniques to be performed on the one or more chunks. Alteration techniques may be any technique that is used to modify the chunk. An example of an alteration technique is the named-entity recognition (NER) technique, which involves identifying words in a chunk that are determined to be entities (e.g., persons, organizations, place, things, objects, money, time, percentages, dates) and, after identifying such words, associating them with a corresponding entity type. Another example of an alteration technique is a summarization technique, which involves summarizing text in the chunk. More specifically, the summarization technique may identify important topics or information within the chunk and generate a summary that (1) is a condensed version of the original chunk (e.g., comparatively less words) and (2) maintains the same important topics or information identified in the original chunk. It should be noted that there are many ways to perform the summarization technique. For example, the summarization technique may be configured to generate a summary that has a predetermined percentage (e.g., 25%) of the number of words in the original chunk. In another example, the summarization may limit the number of words to a predetermined number (e.g., 200 or 300 words).

At block 208, the alteration module 112*a* modifies the chunks according to an alteration technique. In some embodiments, the alteration techniques may be performed based at least in part on machine learning techniques (e.g., natural language processing techniques). More specifically, the alteration module 112*a* may have access to language models or large language models (LLM) stored in the machine learning store 114. The alteration module 112*a* may request an LLM based on the alteration technique that the alteration module 112*a* is to perform on one or more chunks. For example, the machine learning store 114 may store a plurality of LLM, where an LLM is trained for, or fine-tuned to understand, and associated with altering one or more chunks based on an alteration technique (e.g., NER technique or summarization technique). More specifically, there may be an LLM that is specially trained and fine-tuned to perform the NER technique, while there may be another different LLM that is specially trained and fine-tuned to perform the summarization technique. In some embodiments, the NER technique may be performed by a fine-tuned Transformer-based model. An advantage of using a fine-tuned Transformer-based model is that it allows access to domain-specific knowledge inherent to such fine-tuned model. Further, it should be noted that the Transformer-based model used for performing the NER technique may be fined-tuned to perform another task (that is not the NER technique).

An example of an NER technique being performed on a chunk is illustrated in FIG. 3A, which shows (1) an original chunk being represented by a portion of a policy in, for example, an employee handbook ("Original Chunk Text"), (2) an NER output of such chunk ("NER Output"), and (3) a finalized NER output ("Final text to be embedded"). When the NER technique is performed on the original chunk, the alteration module 112a identifies the words in the original chunk that are determined to be entities, and maps such words to a proper entity type. In some embodiments, the entities may be predetermined based on known categories or topics, and such predetermined entities may be used to train the LLM or another model (e.g., Transformer-based model) performing the NER technique.

As shown in FIG. 3A, with respect to the "Original Chunk Text" and the "NER output," the first word (determined to be an entity) extracted from the chunk is "1.07," which is mapped to an entity type of "Bullet." The next word is "DEFERRAL," which is mapped to an entity type of "Deferral." The next word is "DEFERRAL CONTRIBUTIONS," which is mapped to "Contribution." As is evident, the entities may include two or more words. Further, the words determined to be entities in the chunk may be mapped two or more times depending on how they are used in the chunk. In other words, "DEFERAL" is determined to be one entity, while "DEFERRAL CONTRIBUTIONS" is determined to be another entity.

After the NER output is generated, the alteration module 112a may finalize the NER output by deduplicating the words and arranging them based on frequency. For example, the phrase "deferral contributions" occurs at least three times in the "Original Chunk Text" example of FIG. 3A. As such, the NER output may include the same number (i.e., three) entities and their corresponding entity types. In response, the alteration module 112a determines the entities that are the same, and deduplicates (e.g., removes copies) or merges together the same entities. After performing such deduplication, the entities (including their corresponding entity types) are arranged or sorted according to their frequency with the entities having the highest frequency at the beginning of the list and the entities with the lowest frequency at the bottom of the list.

An example of a summarization being performed on a chunk is illustrated in FIG. 3B, which shows (1) an original chunk being represented by a portion of a policy in, for example, an employee handbook ("Before summarization") and (2) a summary of the chunk ("After summarization"). When the summarization technique is performed on the original chunk, the alteration module 112a identifies information in the chunk that is deemed to be pertinent or important. In some embodiments, the LLM used by the alteration module 112a to perform summarization may be trained to determine which information in a chunk should be deemed as important or pertinent. In other embodiments, the LLM used by the alteration module 112a to perform summarization may use an abstraction-based method, which involves paraphrasing (or shortening) of the chunk and creating new phrases and sentences that relay the information deemed to be important from the chunk. In further embodiments, the LLM used by the alteration module 112a to perform summarization may use an extraction-based method in which the LLM pulls key phrases from the chunk and combines them to generate a summary. In short, the most important information contained in the original chunk is maintained in the summarized (or modified) chunk. For example, superfluous information (e.g., section numbers ("1.07, 1.97(a)(6)(B)(i)(IV)"), titles ("DEFERRAL CONTRIBUTIONS")), may be removed in the summarization of the original chunk. Further, the text is simplified to focus on the most pertinent information ("All such Employees who have never had a Deferral Contribution election in place").

At block 210, the chunk embedding module 112b generates an embedding of the modified chunks. In some embodiments, after generating the modified chunks using an alteration technique, the alteration module 112a may transmit the modified chunks to the chunk embedding module 122b. In some embodiments, the chunk embedding module 112b may convert the chunk into embeddings or vectors using one or more word embedding algorithms, such as word2vec (as described in T. Mikolov et al., "Efficient Estimation of Word Representations in Vector Space," arXiv: 1301.3781v3 [cs.CL] 7 Sep. 2013, incorporated herein by reference) or GloVe (as described in J. Pennington et al., "GloVe: Global Vectors for Word Representation," Proceedings of the 2014 Conference on Empirical Methods in Natural Language Processing (EMNLP), October 2014, pp. 1532-1543, incorporated herein by reference). More specifically, embeddings are words represented according to a multidimensional vector (e.g., a word may be represented by a single row or column vector having fifty numbers as elements of the vector). An LLM (configured for embedding) or SentenceTransformers (which is a Python framework for state-of-the-art sentence, text and image embeddings.) may have been trained to determine how to convert a word into an embedding, and may generate a list pairing each word to its corresponding vector equivalent. As such, in some embodiments, the converting of the word into an embedding may not necessarily require such LLM configured for embedding (or the SentenceTransformers). Instead, a simple algorithm for matching words to predefined vectors may be used.

The embeddings allow an LLM (e.g., accessed by the alteration module 112b to perform alteration techniques) to more efficiently distinguish or recognize relationships between words. This is in part because the embeddings are numerical values, which are more easily understood (and processable) by an LLM. An example of a technique to determine semantic similarity between words is using a measurement function (e.g., a heuristic quantification method of keyword matching, such as cosine similarity, Euclidean distance, Manhattan distance, Jaccard similarity, and Minkowski distance. Cosine similarity may be determined by taking the division between the dot product of vectors and the product of the Euclidean norms or magnitude of each vector. The resulting cosine similarity score may range from zero to one, with a score closer to one indicating higher semantic similarity between the two words (e.g., "King" and "Man" have a score of 0.98), and a score closer to zero indicating lower semantic similarity between the two words (e.g., "King" and "car" have a score of 0.14).

At block 212, the chunk preprocessing system 112 transmits embeddings of the modified chunks to the embeddings database 118. In some embodiments, the transmission of the embeddings may be performed after the chunk embedding module 112b generates the embedding of the modified chunks. In other embodiments, the transmission of the embeddings may be performed after all of the alteration techniques have been performed on the chunks (e.g., after block 214). In further embodiments, the chunk preprocessing system 112 may transmit the modified chunks to the chunk database 116. Each modified chunk may be associated with the original chunk and the embeddings of the modified chunk by using the chunk identifier of the original chunk.

At block 214, the chunk preprocessing system 112 determines whether there are more alteration techniques to perform on the chunk. In case that there are more alteration techniques (block 214, yes), the process goes back to block 208. As discussed previously, the alteration preprocessing system 112 may modify the chunks according to an alteration technique. For example, a first type of alteration may be performed for a group of chunks. Then, a second type of alteration may be performed for the same group of chunks. Afterwards, a third type of alteration may be performed for the same group of chunks. Consequently, there may be three groups of modified chunks generated by the alteration module 112a, each of which corresponds to a different alteration technique, but originating from the same original group of chunks. Likewise, there may be three groups of embeddings of the modified chunks, each of which corresponds to a different alteration technique performed on the original group of chunks. On the other hand, in the case that there are no more alteration techniques (block 214, no), the routine ends at block 216.

Example Routine for Preprocessing Large Chunks

When a routine described herein (i.e., 200, 400, 500, 600, 700, 900, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300 shown in FIG. 13, and executed by one or more processors. In some embodiments, the routine 200, 400, 500, 600, 700, 900 and 1100, or portions thereof may be implemented on multiple processors, serially or in parallel.

Figure 4:
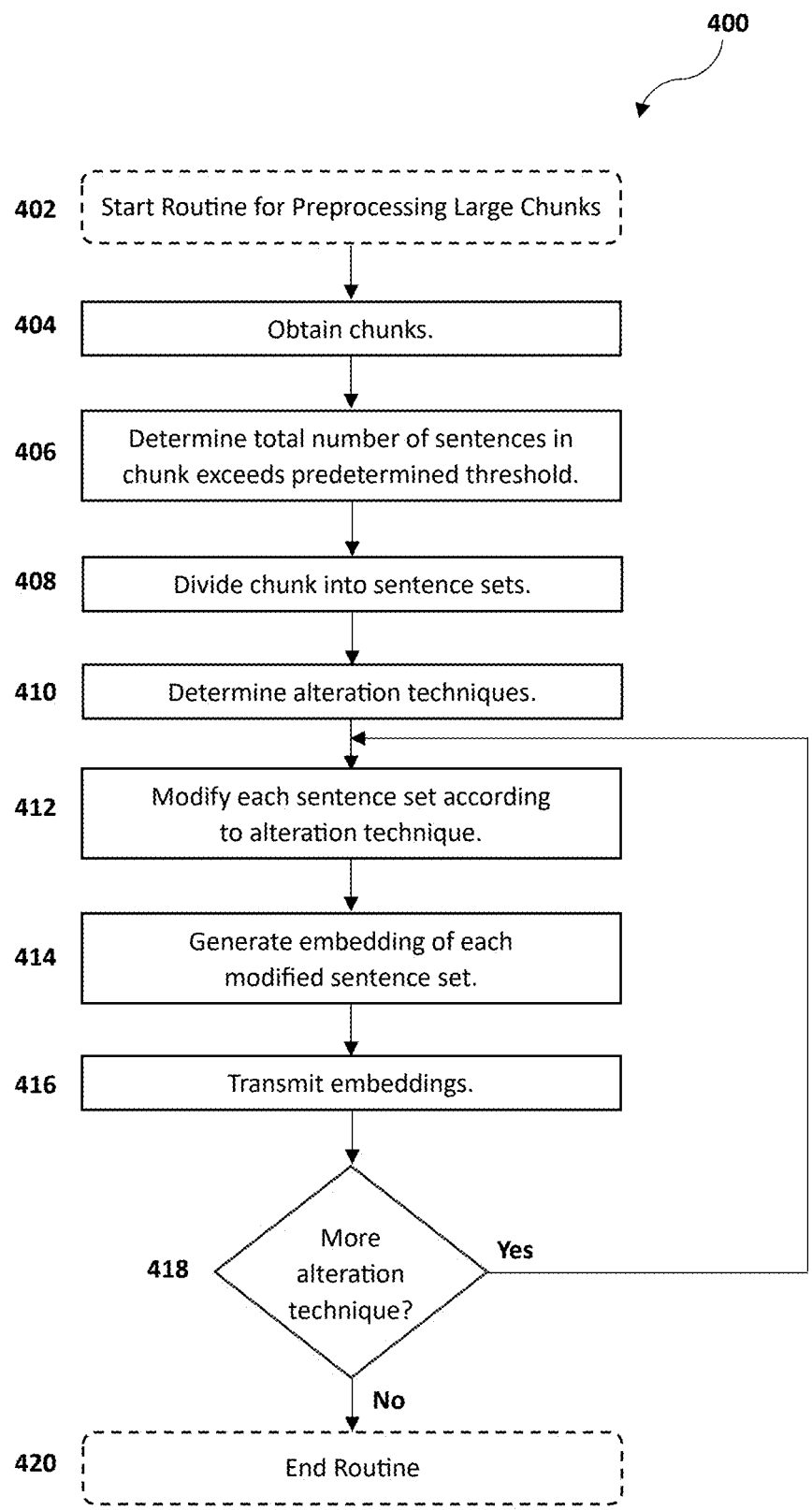
FIG. 4 is a flow diagram of a computerized method for preprocessing large chunks.
Figure 8:
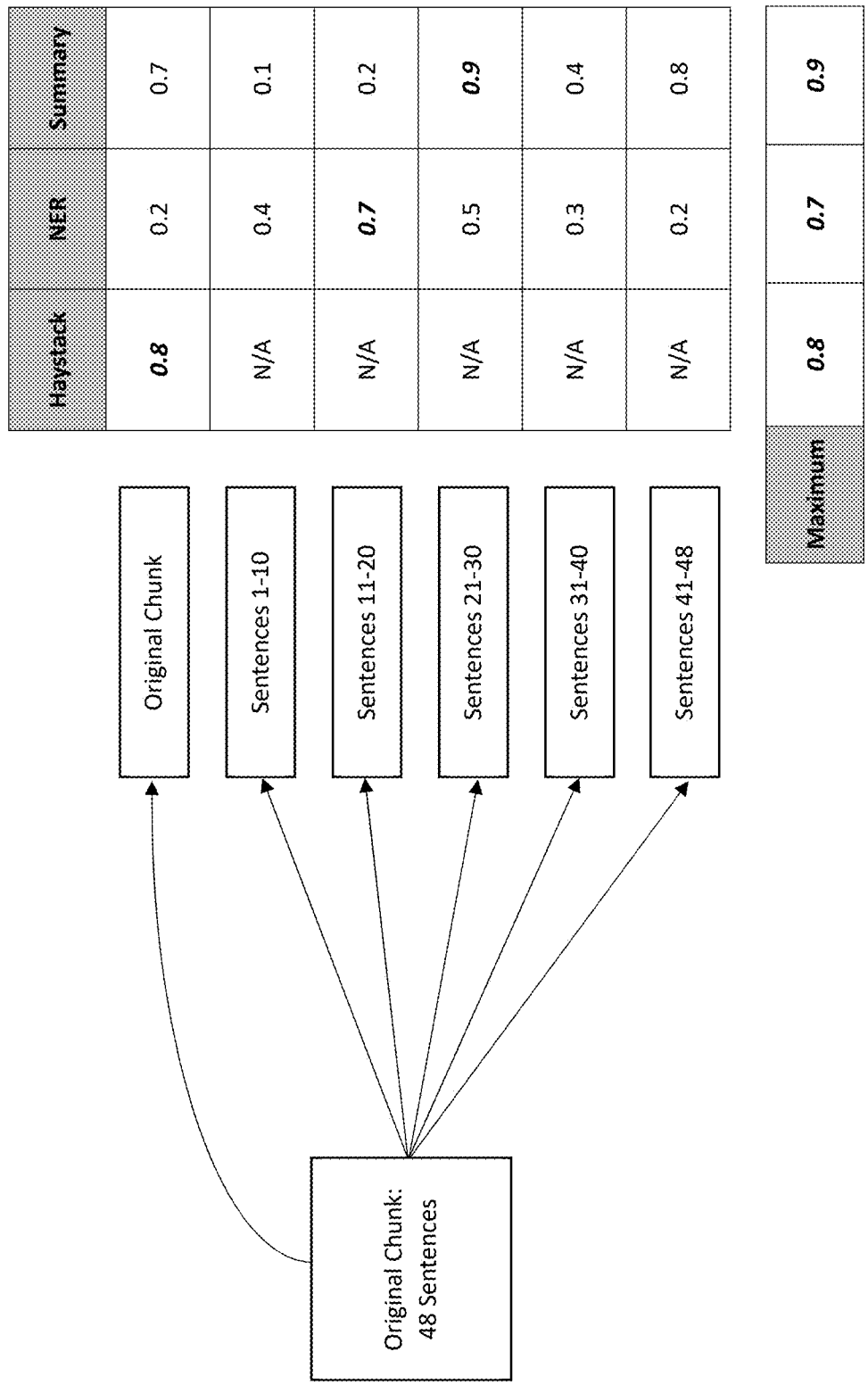
FIG. 8 is an example of diagram illustrating the feature of dividing a chunk into one or more sentence sets, and determining one or more first and second weight scores based on the one or more sentence sets.

FIG. 4 illustrates example routine 400 (beginning at block 402) for preprocessing large chunks, that is performed, for example, by the chunk preprocessing system 112. At block 404, the chunk preprocessing system 112 obtains one or more chunks from the chunk database 116. For example, the chunk preprocessing system 112 may communicate with the chunk database 116 over the network 104 to obtain copies of the chunks therein. At block 406, the chunk preprocessing system 112 may determine that the total number of sentences in chunk exceeds a predetermined threshold. In other words, the chunk preprocessing system 112 performs such determination for each chunk obtained from the chunk database 116. It should be noted that the predetermined threshold may not necessarily correspond to the number of sentences in the chunk. In other words, another unit may be used instead such as the total number of words, clauses, characters, or phrases. At block 408, the chunk preprocessing system 112 divides the chunk into a plurality of sentence sets. For example, each sentence sets may include one or more sentences, whose total does not exceed the predetermined threshold. In some embodiments, the number of sentences in each sentence set may be obtained by dividing the total number of sentences in the chunk by the predetermined threshold. In cases where the result is not a whole number, the last sentence set may include less sentences than the preceding sentence sets. An illustrative example of such division is shown in FIG. 8, in which an original chunk of forty-eight sentences was determined to exceed a predetermined threshold (e.g., ten sentences) and therefore is divided into sentence sets that each include ten sentences, with the last sentence set having eight sentences.

At block 410, the alteration module 112a determines the alteration techniques to perform on the sentence sets. At block 412, the alteration module 112a modifies each sentence set according to an alteration technique. In other words, instead of modifying the entire chunk, as may be the case in FIG. 2, the alteration module 112a modifies each sentence set individually to generate a plurality of modified sentence sets. Such alteration techniques may include the NER technique and/or the summarization technique, which are described in detail with respect to the process illustrated in FIG. 2. At block 414, the chunk embedding module 112b generates an embedding for each of the modified sentence sets. Descriptions of embeddings and their generation are described with respect to the process illustrated in FIG. 2.

At block 416, the chunk preprocessing system 112 transmits the embeddings of the modified sentence sets to the embeddings database 118. For example, the modified sentence sets may be grouped according to their alteration type and their connection with the original chunk from which the original sentence sets were divided. In some embodiments, the transmission of the embeddings may be performed after the chunk embedding module 112b generates the embedding of the modified sentence sets. In other embodiments, the transmission of the embeddings may be performed after all of the alteration techniques have been performed on the sentence sets (e.g., after block 414). In further embodiments, the chunk preprocessing system 112 may transmit the modified sentence sets to the chunk database 116. Each modified sentence set may be associated with the original chunk and the embeddings of the modified sentence set by using the chunk identifier of the original chunk. At block 418, the chunk preprocessing system 112 determines whether there are more alteration techniques to perform on the sentence sets. In case that there are more alteration techniques (block 418, yes), the process goes back to block 412. As discussed previously, the alteration preprocessing system 112 may modify the sentence sets according to an alteration technique. For example, a first type of alteration may be performed for each of the sentence sets divided from the original chunk. Then, a second type of alteration may be performed for the same sentence sets divided from the original chunk. Afterwards, a third type of alteration may be performed for the same sentence sets divided from the original chunk. Consequently, there may be three groups of modified sentence sets generated by the alteration module 112a, each of which corresponds to a different alteration technique, but originating from the same sentence sets. Likewise, there may be three groups of embeddings of the modified sentence sets, each of which corresponds to a different alteration technique performed on the original sentence sets of the original chunk. On the other hand, in the case that there are no more alteration techniques (block 418, no), the routine ends at block 420.

Example Routine for Performing Initial Search

When a routine described herein (i.e., 200, 400, 500, 600, 700, 900, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300 shown in FIG. 13, and executed by one or more processors. In some embodiments, the routine 200, 400, 500, 600, 700, 900 and 1100, or portions thereof may be implemented on multiple processors, serially or in parallel.

Figure 5:
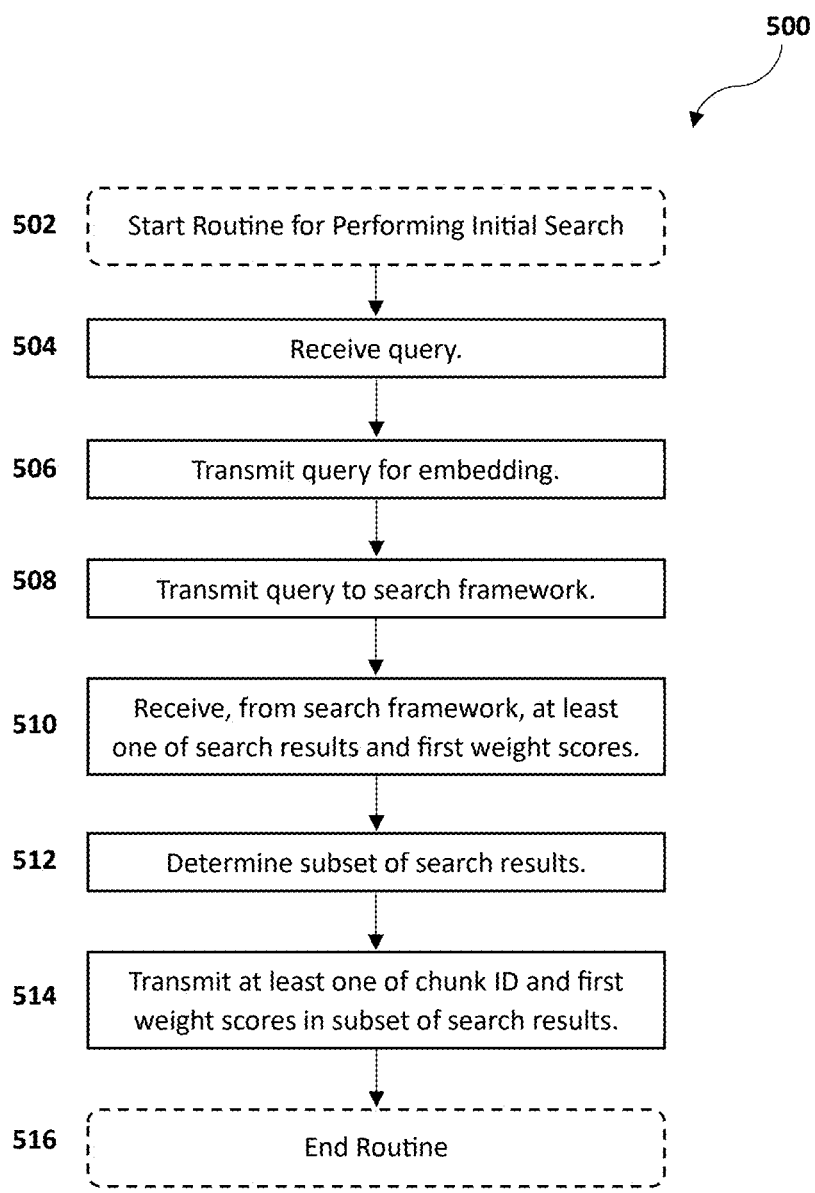
FIG. 5 is a flow diagram of a computerized method for performing an initial search.

FIG. 5 illustrates example routine 500 (beginning at block 502) for performing an initial search, that is performed, for example, by the search API 110a. At block 504, the search framework 108 may receive a query from the client computing device 102. For example, the search API 110a may be communicating with a browser or search application disposed on the client computing device 102. A user of the client computing device 102 may generate a query, which may be in text or audio format. The query may be considered an input utterance or may include one or more words arranged in a natural language format. The query may be at least one of a declaratory ("10 best stocks at the moment"), interrogatory (e.g., "How much can I contribute each year to my IRA?"), imperative ("Give me a list of countries in Europe"), or exclamatory ("2024 election!") sentence. The query is transmitted by the client computing device 102 (e.g., over the network 104) to the service computing device 106, which in turn is received by the search API 110a.

At block 504, the search API 110a transmits the query for embedding. For example, the search API 110a may transmit the query to the query embedding module 110b. The query embedding module 110b may then generate an embedding of the query. The embedding of the query may include conversion of the query into a vector format. Descriptions of embeddings and their generation are described with respect to the process illustrated in FIG. 2. At block 506, the search API 110a also transmits the query to the search framework 108. In some embodiments, the search framework 108 may include a search engine that performs searches for chunks in the chunk database 116 depending on the intent of the query (e.g., the specific type of information for which the user is looking). For example, the search engine may utilize a language model (or LLM) or another type of machine learning model (e.g., Transformer-based model) to determine the relevance of chunks in the chunk database 116 to the query. In some embodiments, the search framework 108 may be a Haystack framework, which is an open-source Python framework by deepset GmbH for building custom apps with LLMs. For example, the Haystack framework allows for semantic search on a large collection of documents in any language, generative question answering on a knowledge base containing mixed types of information (e.g., images, text, and tables), and information extraction from documents to populate a database or build a knowledge graph.

At block 510, the search API 110a receives at least one of (1) one or more search results from the search framework 108 and (2) first weight scores. More specifically, the search engine may perform a search for one or more chunks in the chunk database 116 that is relevant to the query, and generate a predetermined number of search results (e.g., 100, 1000, 2000) that are arranged according to a first sequential order. For example, each search result may include a chunk identifier specifying a particular chunk. Such search results are ranked on how relevant the chunks are to the query. For example, the search results may be in a list format, in which results that are most relevant to the query (compared to the other results) are at the top of the list, while result that are least relevant (compared to the other results) to the query are at the bottom. In some embodiments, the search engine may generate a relevancy score (e.g., numerical value) for each search result. For example, the relevancy score indicates (in a numerical value) how relevant a chunk associated with the search result is to the query. The relevancy score may assist the search engine in arranging the search results, in which results with the highest scores may be at the top of the list and results with the lowest scores may be at the bottom of the list. As such, the search engine may transmit the relevancy scores as first weight scores to the search API 110a.

In some embodiments, the search API 110a may receive, from the search framework 108, (1) one or more search results, each of which includes a chunk identifier and (2) a first weight score for each of the one or more search results. It should be noted that, in some embodiments, the search engine or the search framework 108 may not be necessarily modified in any manner (e.g., existing search engine, conventional search engine). The search API 110a merely obtains or receives information (e.g., chunk identifiers, first weight scores) from the search engine or the search framework 108. In other embodiments, the first weight score cannot be obtained or accessed from the search engine or the search framework. For example, it may be that the search engine or search framework (e.g., Amazon Kendra®) returns search results without the first weight score. As such, at block 510, it may be that only the search results are received.

Figure 10:
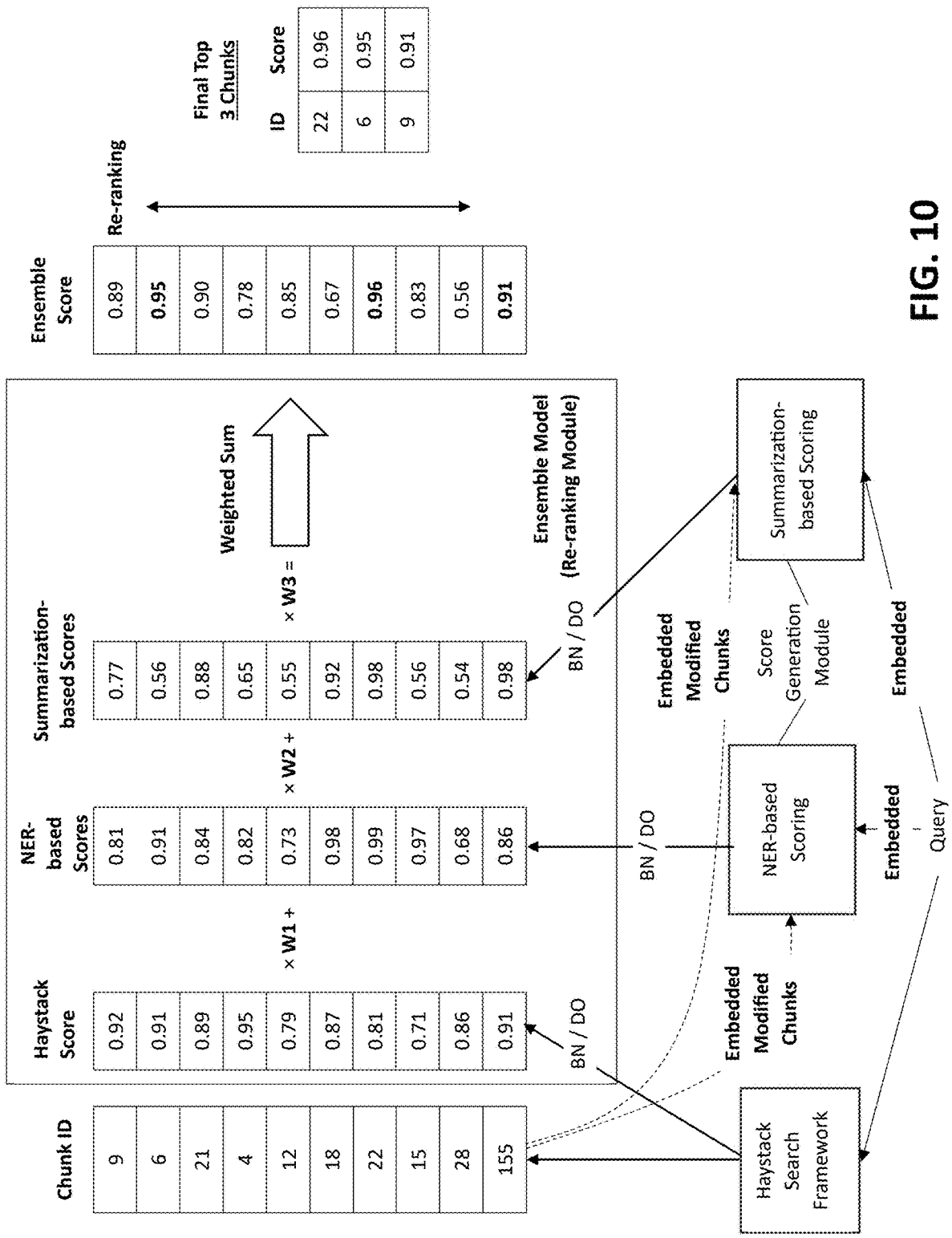
FIG. 10 is a diagram illustrating the architecture for re-ranking search results.

At block 512, the search API 110a determines a subset of search results from the one or more search results received from the search framework 108. In other words, the subset of search results may be a predetermined portion of the one or more search results. In some embodiments, the subset of search results includes a predetermined number of the top-ranking search results (e.g., top one-hundred search results of the one thousand search results). In some embodiments, the subset of search results may include a chunk identifier for each result in the subset of search results. In some embodiments, the subset of search results may also include first weight scores corresponding to each result (or chunk) in the subset of search results. In further embodiments, the search framework 108 may be a Haystack search framework as shown in FIG. 10. As such, the scores generated by the Haystack search framework are Haystack scores. At block 514, the search API 110a transmits the chunk identifiers corresponding to the subset of search results to the score generation module 110c and transmits the subset of search results (including at least one of the chunk identifier and first weight scores) to the re-ranking module 110d. As discussed previously, it may be that the first weight score cannot be obtained or accessed from the search engine or the search framework (e.g., Amazon Kendra®). In other words, the search engine or search framework returns search results without the first weight score. As such, at block 514, it may be that only the subset of search results (and corresponding chunk identifiers) are transmitted to the re-ranking module 110d. The routine ends at block 516.

Example Routine for Generating Weight Scores

When a routine described herein (i.e., 200, 400, 500, 600, 700, 900, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300 shown in FIG. 13, and executed by one or more processors. In some embodiments, the routine 200, 400, 500, 600, 700, 900 and 1100, or portions thereof may be implemented on multiple processors, serially or in parallel.

Figure 6:
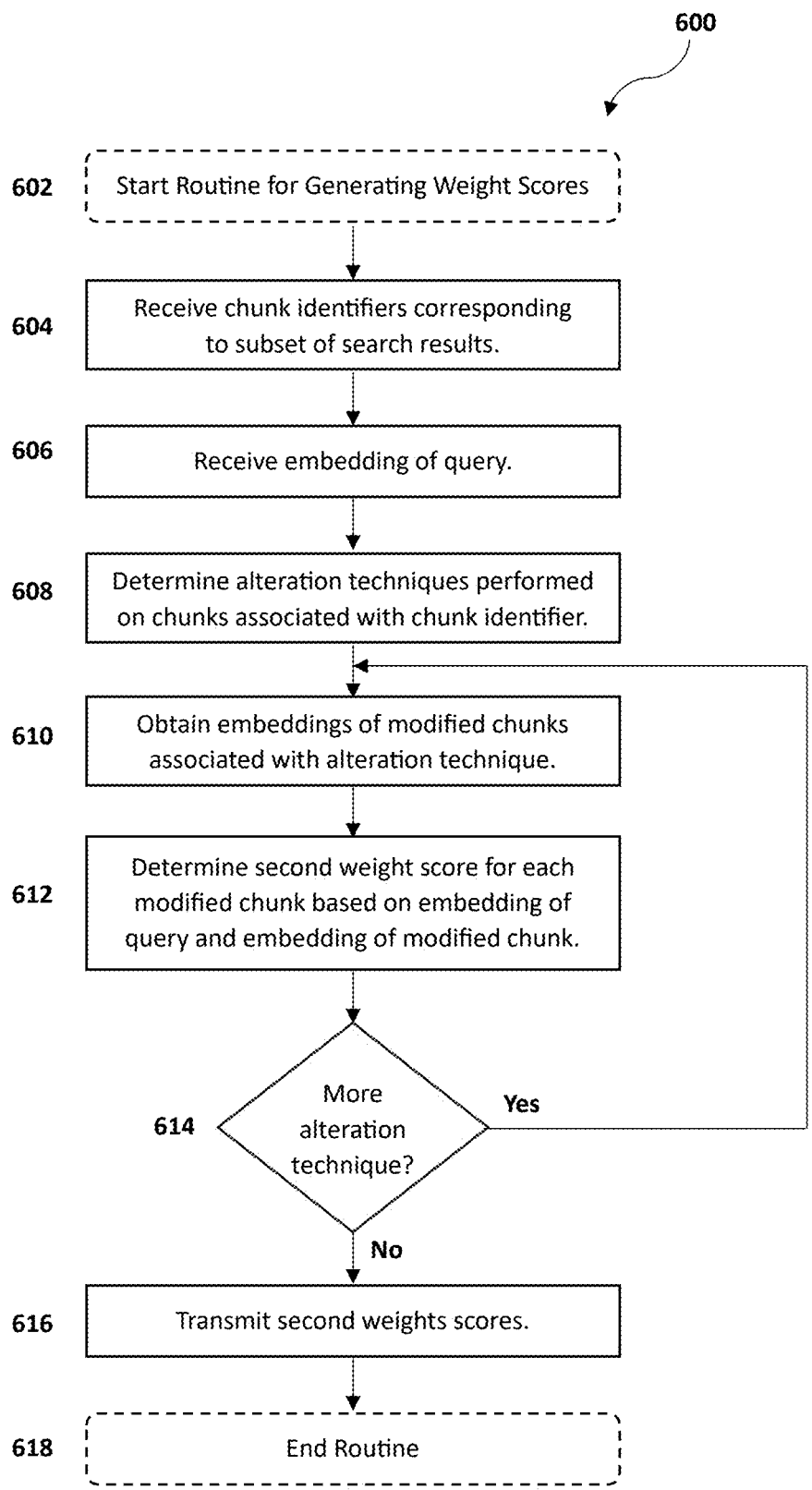
FIG. 6 is a flow diagram of a computerized method for generating weight scores.

FIG. 6 illustrates example routine 600 (beginning at block 602) for generating weight scores, that is performed, for example, by the score generation module 110c. At block 604, the score generation module 110c receives one or more chunk identifiers corresponding to the subset of search results determined by the search API 110a. In some embodiments, the chunk identifiers may be arranged according to the first sequential order. In other embodiments, the chunk identifiers may not be arranged in any order (e.g., random). At block 606, the score generation module 110c receives the embedding of the query from the query embedding module 110b.

At block 608, the score generation module 110c determines the alteration techniques performed on chunks associated with chunk identifier. More specifically, the second weight score is determined for each chunk in each group of modified chunks. For example, each of the original chunks associated with the subset of search results may have been modified using both the NER technique and the summarization technique. As such, the score generation module 101c may determine a second weight score for the chunks (corresponding to the subset of search results) that have been modified using the NER technique and a second weight score for the chunks that have been modified using the summarization technique. In short, the second weight score is generated for each type of alteration technique performed on the original chunk (corresponding to the subset of search results).

It should be noted that, in some embodiments, each type of the second weight scores can be determined with an arbitrary alteration technique as long as each chunk associated with the chunk identifiers in the subset of search results is modified with the same alteration technique (e.g., if one chunk in the subset of search results is modified with the NER technique, then the remaining chunks in the subset of search results are to be modified with the NER technique as well). Such features allow for domain-specific knowledge in searching without fine-tuning the LLM or the machine learning model (e.g., Transformer-based model). Further, an indetermined amount of second weight scores can be generated for corresponding alteration techniques. In other words, there is no limit to the number of alteration techniques to be performed on the chunks to generate a corresponding number of second weight scores. At block 610, the score generation module 110c may obtain embeddings of the modified chunks associated with an alteration technique from, for example, the embedding database 118. For example, the score generation module 110c may begin obtaining embeddings of chunks that have been modified using the NER technique. In some embodiments, the score generation module 110c may obtain the embeddings of the modified chunks from the embeddings database 118. At block 612, the score generation module 110c determines a second weight score for each chunk in the subset of search results that have been modified according to an alteration technique. Such determination is made based at least in part on the embedding of the query and the embedding of the modified chunk. In some embodiments, the determination may be performed using a measurement function (e.g., a heuristic quantification method of keyword matching), such as cosine similarity, Euclidean distance, Manhattan distance, Jaccard similarity, and Minkowski distance.

It should be noted that the generation of second weight scores is not limited to the aforementioned approach (e.g., text-alteration or embedding) but may also include any processes that can quantify query-chunk combinations, such as, but not limited to, cross-encoders, general multi-class classifiers etc. As such, in some embodiments, the second weight scores are generated based on usage of a cross-encoder, which is a type of neural network architecture used in natural language processing tasks, particularly in the context of sentence or text pair classification. The purpose is to evaluate and provide a single score or representation for a pair of input sentences, indicating the relationship or similarity between them.

More specifically, a cross-encoder takes a pair of input sentences or texts. This could be a pair of sentences, paragraphs, or any form of text that needs to be compared or evaluated together. The input sentences are tokenized, converting them into a sequence of tokens. These tokens are then typically embedded into vector representations using word embeddings (e.g., Word2 Vec, GloVe) or contextual embeddings (e.g., BERT). The output of the cross-encoder is a single score (cross-encoding score) or probability indicating the degree of relatedness between the input pairs. This score can be used for tasks like ranking, sorting, or filtering pairs of sentences based on relevance or similarity. In the present system, using a cross-encoding score as one of the score-types further improved performance. Such performance has proven to be much better than a re-ranking (or ranking) approach based solely on cross-encoding.

At block 614, the score generation module 110c determines whether the chunks associated with the subset of search results have been modified according to another alteration technique. In the case that there are more chunks modified according to another alteration technique (block 614, yes), the process moves to block 610. For example, the chunks associated with the subset of search results may have been modified according to the summarization technique. As such, the score generation module 110c determines second weight scores for each chunk that have been modified according to the summarization technique. In the case that there are no more chunks modified according to another alteration technique (block 614, no), the process moves to block 614. At block 616, the score generation module 110c transmits the second weight scores to the re-ranking module 110d. The routine ends at block 618.

It should be noted that the process in FIG. 6 is also illustrated in portions of FIG. 10 (with slight modifications). More specifically, a subset of search results (e.g., ten search results as shown in FIG. 10) is generated from search results generated by a Haystack search framework. A score generation module (e.g., score generation module 110c) may receive an embedded query (e.g., from the query embedding module 110b). The score generation module may also receive embeddings of chunks that have been modified according to the NER-technique and embeddings of chunks that have been modified according to the summarization technique. As such, the score generation module may generate a first set of second weight scores (NER-based scoring) based on the embedded chunks (modified based on the NER technique) and the embedded query. Similarly, the score generation module may generate a second set of second weight scores (summarization-based scoring) based on the embedded chunks (modified based on the summarization technique) and the embedded query. As shown in FIG. 10, the chunk associated with chunk identifier "9" includes a Haystack score of 0.92, an NER-based score of 0.81, and a summarization-based score of 0.77). A chunk associated with the chunk identifier "12" includes a Haystack score of 0.79, an NER-based score of 0.73, and a summarization-based score of 0.55). A chunk associated with the chunk identifier "155" includes a Haystack score of 0.91, an NER-based score of 0.86, and a summarization-based score of 0.98).

Example Routine for Generating Weight Scores for Large Chunks

When a routine described herein (i.e., 200, 400, 500, 600, 700, 900, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300 shown in FIG. 13, and executed by one or more processors. In some embodiments, the routine 200, 400, 500, 600, 700, 900 and 1100, or portions thereof may be implemented on multiple processors, serially or in parallel.

Figure 7:
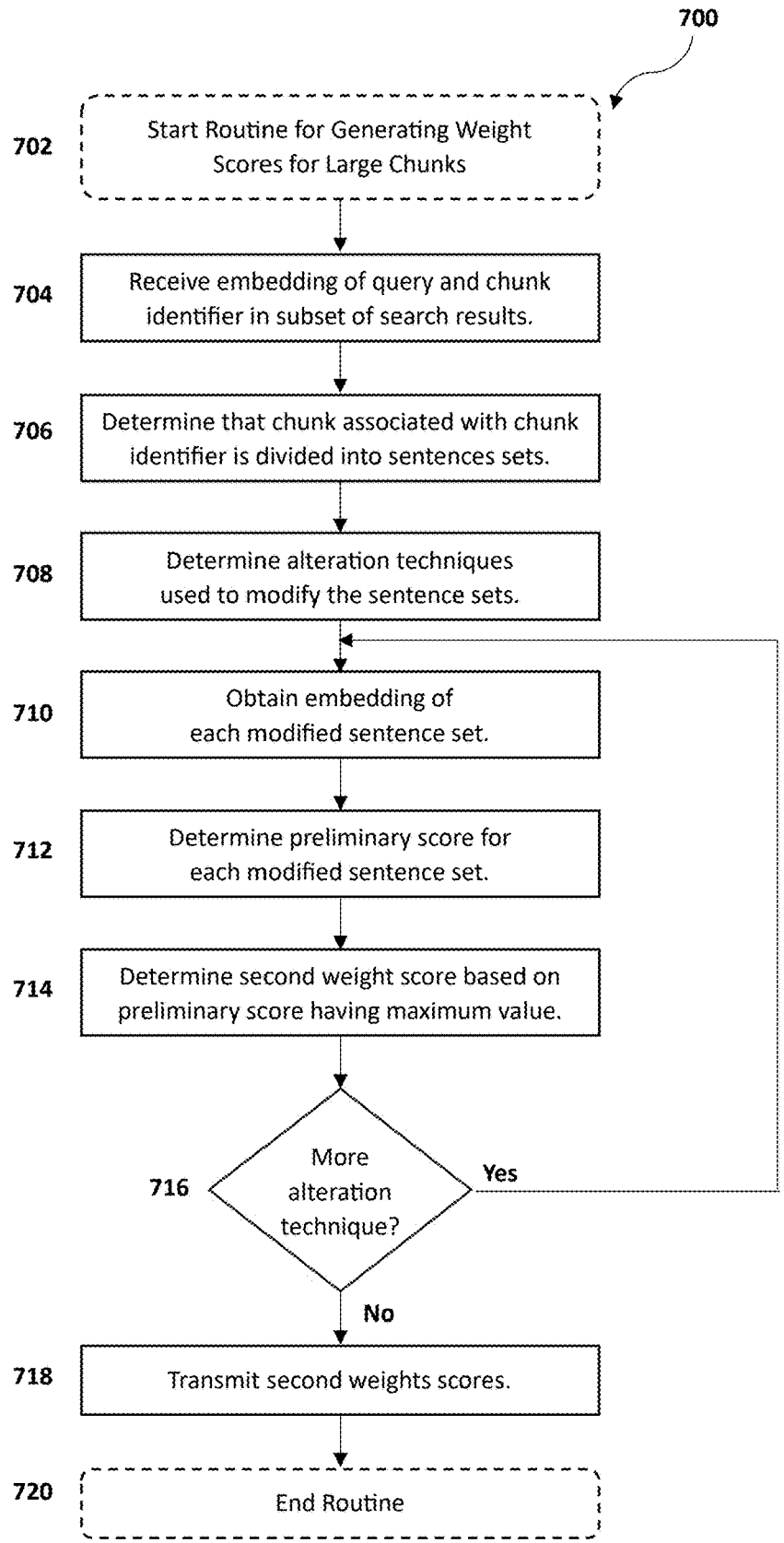
FIG. 7 is a flow diagram of a computerized method for generating weight scores for large chunks.

FIG. 7 illustrates example routine 700 (beginning at block 702) for generating weight scores for large chunks, that is performed, for example, by the score generation module 110c. At block 704, the score generation module 110c receives an embedding of the query and a chunk identifier corresponding to the subset of search results. At block 706, the score generation module 110c may determine that the chunk associated with the chunk identifier has been divided into sentences sets (e.g., according to the process in illustrated in FIG. 4). In some embodiments, when the score generation module 110c receives the chunk identifiers, the score generation module 110c may analyze each of the chunks associated with the chunk identifiers in the subset of search results to determine whether at least one has been divided into a plurality of sentence sets.

At block 708, the score generation module 110c determines the alteration techniques performed on the sentence sets corresponding to the chunk associated with the chunk identifier in the subset of search results. For example, each of the sentence sets may have been modified using both the NER technique and the summarization technique. In short, the second weight score is generated for each type of alteration technique performed on the sentence sets. At block 710, the score generation module 110c obtains an embedding of each modified sentence set from, for example, the embedding module 118.

At block 712, the score generation module 110c determines a preliminary score for each modified sentence set (modified according to a specific alteration technique). Such determination is made based at least in part on the embedding of the query and the embedding of the modified sentence set. In some embodiments, the determination may be performed using a measurement function (e.g., a heuristic quantification method of keyword matching), such as cosine similarity, Euclidean distance, Manhattan distance, Jaccard similarity, and Minkowski distance.

At block 714, the score generation module 110c determines the second weight score based on the preliminary score having the maximum value. In other words, each of the modified sentence sets may be associated with a preliminary score. The highest preliminary score out of the preliminary scores determined for each of the modified sentence sets is selected to be the second weight score. At block 716, the score generation module 110c determines whether the sentence sets associated with the chunk corresponding to a chunk identifier in the subset of search results have been modified according to another alteration technique. In the case that there are more sentence sets modified according to another alteration technique (block 716, yes), the process moves to block 718. For example, the sentence sets may have been modified according to the summarization technique. As such, the score generation module 110c determines preliminary scores for the sentence sets that have been modified according to the summarization technique. Like previously, the highest preliminary score out of the preliminary scores determined for each of the modified sentence sets is selected to be the second weight score. In the case that there are no more sentence sets modified according to another alteration technique (block 716, no), the process moves to block 718. At block 718, the score generation module 110c transmits each of the second weight scores (that were generated according to the process in FIG. 7) to the re-ranking module 110d. The routine ends at block 720.

It should be noted that the process in FIG. 7 is also illustrated in portions of FIG. 8 (with slight modifications). As shown in FIG. 8 (and as described previously), an original chunk may have a total number of sentences that may be greater than or equal to a predetermined threshold (e.g., ten sentences). As a result, the original chunk is split into a plurality of sentence sets. Each sentence set includes one or more sentences that may be less than or equal to a predetermined threshold. Further, each of the sentence sets may be modified according to an alteration technique. In the example shown in FIG. 8, each of the sentence sets have been modified according to the NER technique and the summarization (summary) technique. As such, a plurality of preliminary scores (0.2, 0.4, 0.7, 0.5, 0.3, 0.2) are generated for the sentence sets that have been modified using the NER technique. The maximum preliminary score (0.7) is selected to be the second weight score (representing the NER technique). Likewise, a plurality of preliminary scores (0.7, 0.1, 0.2, 0.9, 0.4, 0.8) are generated for the sentence sets that have been modified using the NER technique. The maximum preliminary score (0.9) is selected to be the second weight score (representing the summarization technique).

In some embodiments (as is the case in FIG. 8), the Haystack score is not determined for each of the sentence sets, and instead the first weight score (representing the Haystack score) is the Haystack score corresponding to the original chunks. In other embodiments, a preliminary score (representing the Haystack score) is generated for each of the sentence sets. Similarly, the maximum preliminary score is selected to be the second weight score (representing the Haystack score). In addition, it should be noted that the NER second weight score (0.2), and the summary second weight score (0.7) in connection with the original chunk are also illustrated in FIG. 8 to indicate the difference in values between determining second weight scores based on the sentence set and determining second weight scores based on the original chunk. As such, the Haystack first weight score (0.8), NER second weight score (0.7), and the summarization second weight score (0.9) are transmitted to the re-ranking module 110d.

Example Routine for Generating Weight Scores for Re-Ranking Search Results

When a routine described herein (i.e., 200, 400, 500, 600, 700, 900, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300 shown in FIG. 13, and executed by one or more processors. In some embodiments, the routine 200, 400, 500, 600, 700, 900 and 1100, or portions thereof may be implemented on multiple processors, serially or in parallel.

Figure 9:
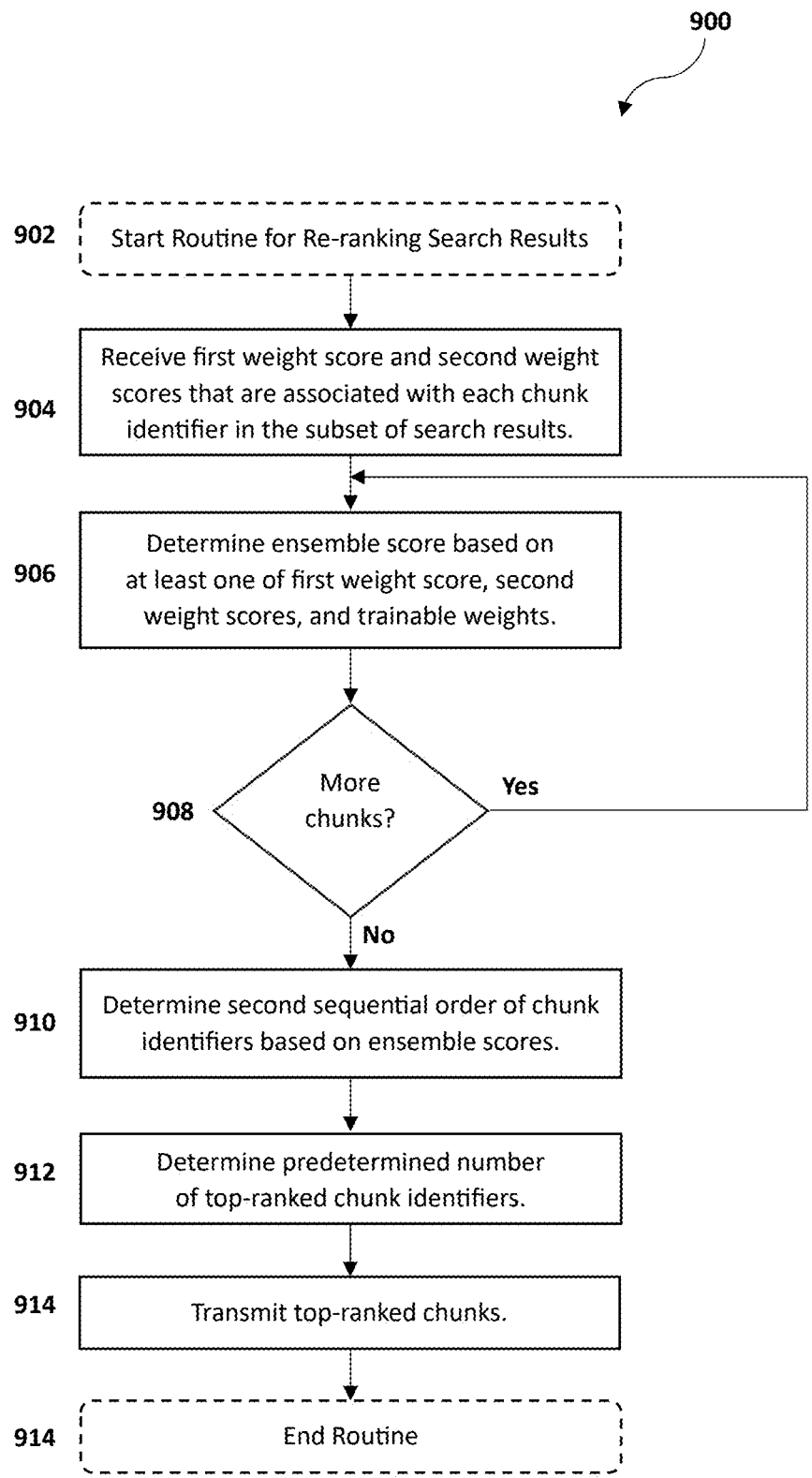
FIG. 9 is a flow diagram of a computerized method for re-ranking search results.

FIG. 9 illustrates example routine 900 (beginning at block 902) for re-ranking search results, that is performed, for example, by the re-ranking module 110d. As discussed previously, when a query (generated by a user of the client computing device 102) is received by the search API 110a of the server computing device 106, the search framework 108 generates one or more search results that are determined relevant to the query. The one or more search results may include chunk identifiers that correspond to chunks stored in the chunk database 116. The chunk identifiers in the one or more search results may be arranged in a first sequential order based on how relevant the chunk (associated with the chunk identifier) is to the query. Further, the one or more search results may also include first weight scores that correspond to the chunk identifiers. The first weight scores may determine the first sequential order of the chunk identifiers. In addition, the search API 110a may also transmit the query to be embedded by the query embedding module 110b (the concept of embedding is discussed in the description corresponding to FIG. 2).

Next, the search API 110a transmits a subset of the one or more search results to the re-ranking module 110d. The subset of search results may include a predetermined number of the top-ranked chunk identifiers as well as their corresponding first weigh scores. The search API 110a also transmits chunk identifiers associated with the subset of search results to the score generation module 110c. In turn, the score generation module 110c generates sets of second weight scores (e.g., a first set of second weight scores for NER modified chunks or a second set of second weight scores for summarization modified chunks) based on the embedded query and the embeddings of the modified chunks associated with the chunk identifier in the subset of search results (obtained from the embedding database 118). Next, the score generation module 110c transmits the second weight scores (along with corresponding chunk identifiers) to the re-ranking module 110d.

At block 904, the re-ranking module 110d receives a first weight score and second weight scores that are associated with each chunk identifier in the subset of search results. At block 906, the re-ranking module determines the ensemble score for a chunk identifier based on at least one of the first weight score, the second weight scores, and the trainable weights. It should be noted that it is not necessary to determine the ensemble score using the first weight score. This is because in some cases the first weight score cannot be obtained or accessed. For example, it may be that the search engine or search framework (e.g., Amazon Kendra®) returns search results without the first weight score. As such, the determination in block 906 may be determined without the first weight scores. It should also be noted that, in some embodiments, each type of the second weight scores can be determined with an arbitrary alteration technique as long as each chunk associated with the chunk identifiers in the subset of search results is modified with the same alteration technique (e.g., if one chunk in the subset of search results is modified with the NER technique, then the remaining chunks in the subset of search results are to be modified with the NER technique as well). Such features allow for domain-specific knowledge in searching without fine-tuning the LLM or another machine learning model (e.g., Transformer-based model).

In other embodiments, the ensemble score is determined by a machine learning model included in the re-ranking module 110d. The machine learning model may be stored in the machine learning store 114, and requested by the re-ranking module 110d, when the machine learning model is needed. In further embodiments, the machine learning model included in the re-ranking module 110d may have been trained to generate trainable weights for each type of first and second weight scores. Such process is described in more detail with respect to FIG. 11.

In some embodiments, the the process for performing machine learning may incorporate at least one of batch normalization and dropout techniques. In other words, the re-ranking module 110d performs batch normalization for at least one of the first weight scores and the second weight scores. Batch normalization normalizes each output of a hidden layer in a neural network before inputting such output to a next hidden layer. By utilizing batch normalization, gradient descent converges better during training. Dropout techniques (e.g., involving dropout layers) may reduce overfitting by removing or dropping out the nodes (input and hidden layer) in a neural network. The forward and backwards connections with a dropped node are temporarily removed, thus creating a new network architecture out of the parent network. The nodes are dropped by a dropout probability of p.

At block 908, the re-ranking module 110d determines whether there are any more chunk (or chunk identifiers) for which to generate an ensemble score. In the case that there are more chunk identifiers (block 908, yes), the process goes back to block 906. As such, the re-ranking module 110d may generate an ensemble score for each chunk identifier in the subset search results. In the case that there are not more chunk identifiers for which to generate an ensemble score (block 908, no), the process moves on to block 910. In some embodiments, the machine learning model predicts (e.g., via its training and/or machine learning techniques) the ensemble score for a specific chunk identifier based on the Haystack score, NER-based score, and summarization-based score for each chunk identifier.

At block 910, the re-ranking module 110d determines a second sequential order of the chunk identifiers based on the ensemble scores. For example, chunk identifiers with the higher ensemble scores are at the top of the list, while chunk identifiers with the lower ensemble scores are at the bottom of the list. As discussed previously, the chunk identifiers that were received by the re-ranking module 110d were arranged according to the first sequential order, which was determined by a search engine of the search framework 108. However, the ensemble score for each of the chunk identifiers determines their arrangement independent of the first sequential order. In other words, the second sequential order may be different from the first sequential order.

At block 912, the re-ranking module 110d determines a predetermined number of top-ranked chunks. As discussed previously, the subset of search results may be a portion of the search results generated by the search engine of the search framework 108. As such, the re-ranking module 110d performs a similar action by taking a portion of the subset of search results. For example, the original number of search results may be five hundred. A subset of such search results may amount to one hundred. The process performed in block 912 may further reduce the subset of search results from one hundred to ten. Consequently, the ten search results are considered to be the top-ranked search results. At block 914, the re-ranking module 110d transmits the top-ranked chunk identifiers to the search API 110a. In turn, the search API 110a may obtain chunks (e.g., from the chunk database 116) associated with the top-ranked chunk identifiers received from the re-ranking module 110d, and transmit such obtained chunks to the client computing device 102, where it is displayed in the browser or search application disposed thereon.

It should be noted that an advantage of the one or more routines (or processes) recited in this disclosure is that the search framework or search engine need not be modified, and may maintain their current configuration without any changes made thereto, while allowing the search results to be improved by the system and methods described in the present disclosure. Another advantage is that it is not necessary to fine-tune the LLM or another machine learning model (e.g., Transformer-based model) in order to, for example, incorporate domain specific knowledge, thereby saving on time and effort. It should be noted that the process in FIG. 9 is also illustrated in portions of FIG. 10 (with slight modifications) that may be implemented in some embodiments. As shown, the re-ranking module may include a machine learning model (ensemble model) for determining the ensemble score for ten chunk identifiers (9, 6, 21, 4, 12, 18, 22, 15, 28, 155). The re-ranking module may receive Haystack scores from the Haystack search framework (0.92, 0.91, 0.89, 0.95, 0.79, 0.87, 0.81, 0.71, 0.86, 0.91), NER-based scores from the score generation module (0.81, 0.91, 0.84, 0.82, 0.73, 0.98, 0.99, 0.97, 0.68, 0.86), and summarization-based scores from the score generation module (0.77, 0.56, 0.88, 0.65, 0.55, 0.92, 0.98, 0.56, 0.54, 0.98). It should be noted that, in some embodiments, the Haystack search framework is not modified in any manner. The system (e.g., search enhancement system 110) merely obtains or receives information (e.g., chunk identifiers, first weight scores) from the Haystack search framework. The ensemble model may include trainable weights (W1, W2, W3) that are each determined specifically for a specific type of weight score. For example, the trainable weight W1 may be determined specifically for the Haystack score, the trainable weight W2 may be determined specifically for the NER-based score, and the trainable weight W3 may be determined specifically for the summarization-based score. Further, as shown in FIG. 10, batch normalization ("BN") and/or dropout techniques ("DO") may also be incorporated into the ensemble model to increase accuracy (e.g., reduced overfitting) as discussed above.

As such, the ensemble model may generate a weighted sum based on the Haystack score, NER-based score, and summarization-based score for each chunk identifier. In some embodiments, the machine learning model predicts (e.g., via its training and/or machine learning techniques) the ensemble score for a specific chunk identifier based on the Haystack score, NER-based score, and summarization-based score for each chunk identifier. In other embodiments, the ensemble score for a specific chunk identifier is obtained by (1) first multiplying the Haystack score with the trainable weight W1 to generate a Haystack score product, multiplying the NER-based scores with the trainable weight W2 to generate an NER-based score product, and multiplying the summarization-based scores with the trainable weight W3 to generate a summarization-based score product, and then by (2) summing the Haystack score product, the NER-based score product, and the summarization-based score product.

After the ensemble score (0.89, 0.95, 0.90, 0.78, 0.85, 0.67, 0.96, 0.83, 0.56, 0.91) is obtained for each of the chunk identifiers, the re-ranking module arranges the chunk identifiers according to the ensemble score, in which the chunk identifiers with the higher ensemble scores are at the top of the list, and the chunk identifiers with the lower ensemble scores are at the bottom of the list. Next, the re-ranking module determines the top three chunk identifiers (22, 6, 9) with the highest ensemble scores (0.96, 0.95, 0.91), and transmits them to, for example, the search API 110a. In turn, the search API 110a obtains chunks corresponding to the top three chunk identifiers (22, 6, 9) with the highest ensemble scores (0.96, 0.95, 0.91), and transmits them to the computing device 102 for the user to view.

Example Routine for Model Training

When a routine described herein (i.e., 200, 400, 500, 600, 700, 900, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1300 shown in FIG. 13, and executed by one or more processors. In some embodiments, the routine 200, 400, 500, 600, 700, 900 and 1100, or portions thereof may be implemented on multiple processors, serially or in parallel.

Figure 11:
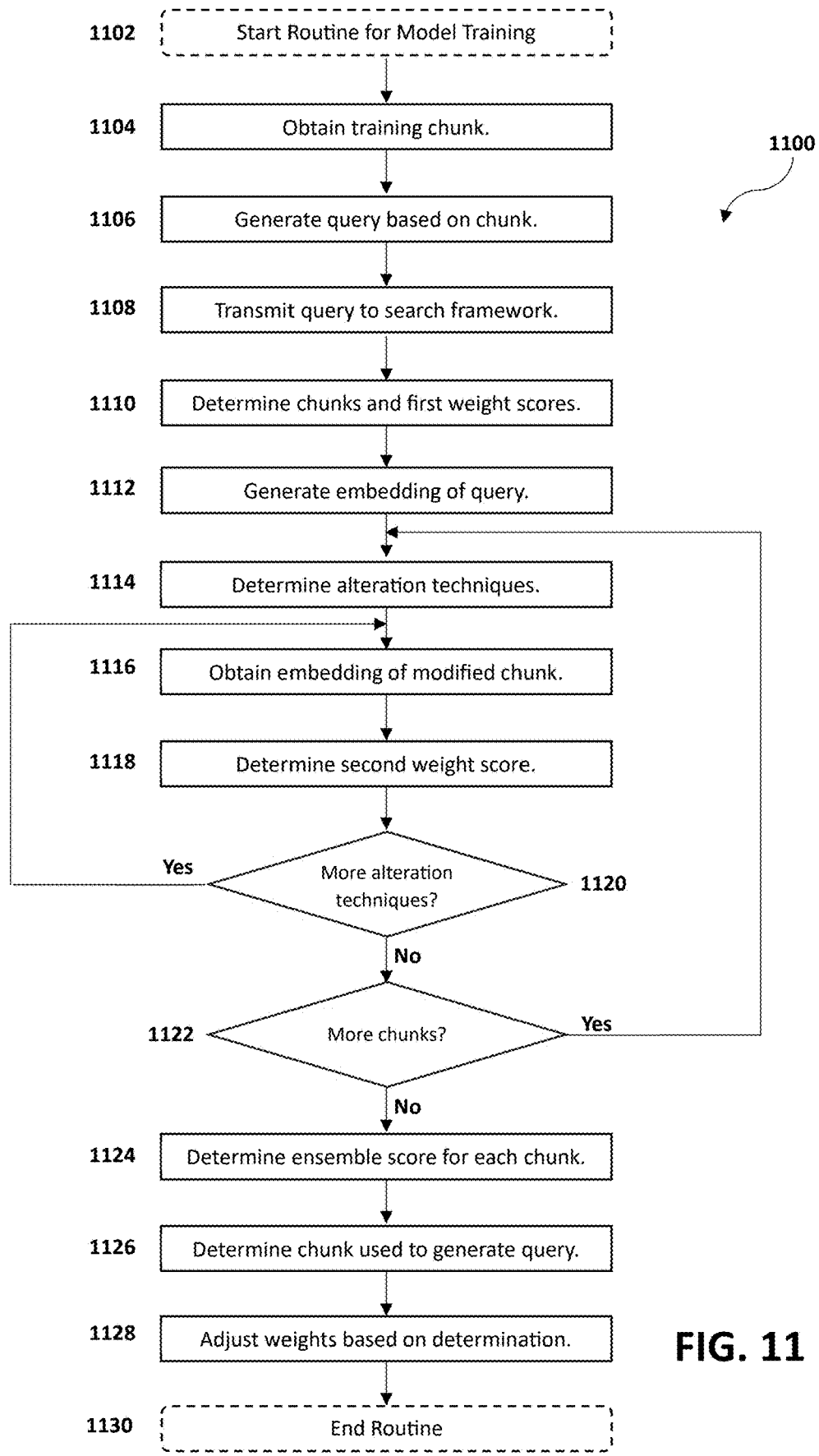
FIG. 11 is a flow diagram of a computerized method for training a machine learning model.

FIG. 11 illustrates example routine 1100 (beginning at block 1102) for model training, that is performed, for example, to train a machine learning model (e.g., ensemble model in FIG. 10) included in the re-ranking module 110d. In short, the training objective may be to generate a predetermined group of chunks, generate a query from one of the chunks in the predetermined group of chunks, and determine whether the machine learning model is capable of determining the chunk from which the query originated. The machine learning model may be stored in the machine learning store 114, and requested by the re-ranking module 110d, when the machine learning model is needed.

At block 1104, a training chunk is obtained. In some embodiments, the training chunk is selected from a predetermined group of chunks. In other embodiments, the training chunk is selected from a plurality of chunks that may be stored in the chunk database 116. At block 1106, a query is generated based on the training chunk. For example, a query generating LLM may be used to generate the query. As such, the query generating LLM may generate a query by analyzing the training chunk. At block 1108, the query is transmitted to the search framework. In some embodiments, the search framework may generate Haystack scores based on the query and the predetermined group of chunks. In such case, it may not be necessary to generate the search results because the chunk was obtained from a predetermined group of chunks (e.g., the search results are already known). In other embodiments, the search framework may generate one or more search results which include chunk identifiers (associated with chunks that are determined to be relevant to the query) and corresponding Haystack scores. In such case, the search framework may generate search results because the search results may further be reduced to obtain a subset of search results. As discussed previously, the one or more search results include chunk identifiers that are relevant to the query generated by the query generating LLM. Further, it should be noted that the one or more search results may include a chunk identifier that corresponds to the training chunk that generated the query.

At block 1110, the chunk identifiers and first weight scores are determined. For example, the first weight scores may be Haystack scores. In some embodiments, the one or more search results returned by the search framework may be reduced to a subset, in which the subset includes a predetermined amount of the top-ranked search results in the one or more search results (as discussed previously). Likewise, the search framework may have transmitted (in the one or more search results) first weight scores that correspond to the one or more search results. It should be noted that it is not necessary to determine the ensemble score using the first weight score. This is because in some cases the first weight score cannot be obtained or accessed. For example, it may be that the search engine or search framework (e.g., Amazon Kendra®) returns search results without the first weight score. As such, the determination in block 1110 may not include the first weight scores. At block 1112, a query of the embedding is generated (the concept of embedding is discussed in the description corresponding to FIG. 2).

At block 1114, the type of alteration technique is determined for a chunk identifier in the predetermined group of chunks or the subset of search results. As discussed previously, chunks may be modified according to one or more alteration techniques (e.g., NER technique or summarization technique). At block 1116, an embedding of the modified chunk is obtained. At block 1118, the second weight score is determined based on the embedding of the query and the embedding of the modified chunk. For example, the determination may be based on measurement function (e.g., a heuristic quantification method of keyword matching), such as cosine similarity, Euclidean distance, Manhattan distance, Jaccard similarity, and Minkowski distance. At block 1120, it is determined whether the chunk has been modified according to any more alteration techniques. In the case the chunk has been modified according to another alteration technique (block 1120, yes), the process moves back to block 1116. Otherwise (block 1122, no), the process moves to block 1122. At block 1122, it is determined whether there are more chunks from which to generate second weight scores. In case that there are more chunks (block 1122, yes), the process moves back to process 1114. In case that there are more chunks (block 1122, no), the process moves to process 1124. In other words, the second weight scores are generated for each modified chunk corresponding to a chunk identifier in the predetermine group of chunks or the subset of search results.

In some embodiments, it is not necessary to generate a second weight score for all the chunks. In other words, there may be a very large number of chunks in the predetermined group of chunks (e.g., tens of thousands, millions, etc.), and therefore it may be inefficient (or take a long time) to generate second weight scores for each of the chunks in the predetermined groups of chunks. It is possible to generate second weight scores for the top-k chunks (where k is an integer greater than one; preferably k=30) of the predetermined group of chunks, so long as the k chunks include the training chunk from which the query was generated. The rest of the chunks that do not include the top-k chunks (including the training chunk) are not used for training. In some embodiments, the k value is large enough to collect a nice set of candidate chunks. We used k=30 in our training. It should be noted that, as discussed further below, the loss function may be used to optimize the training process. In some embodiments, the loss function may utilize the second weight scores corresponding to each chunk in the predetermined group of chunks. Therefore, since the second weight scores were not generated for the non-top-k chunks (unavailable chunks), the second weight scores for the unavailable chunks should be set to an arbitrary low value so that they do not appear in the loss calculation.

In some embodiments, the process for performing machine learning may incorporate at least one of batch normalization and dropout techniques. In other words, the re-ranking module 110d performs batch normalization for at least one of the first weight scores and the second weight scores. Batch normalization normalizes each output of a hidden layer in a neural network before inputting such output to a next hidden layer. By utilizing batch normalization, gradient descent converges better during training. The re-ranking module 110d may also perform dropout techniques (e.g., involving dropout layers), which may reduce overfitting by removing or dropping out the nodes (input and hidden layer) in a neural network. The forward and backwards connections with a dropped node are temporarily removed, thus creating a new network architecture out of the parent network. The nodes are dropped by a dropout probability of p.

At block 1124, the machine learning model (e.g., ensemble model in FIG. 10) included in the re-ranking module 110d determines an ensemble score for each of the chunk identifiers in the subset of search results. The ensemble score may be determined based on the first weight score, second weight scores, and the trainable weights (e.g., W1, W2, W3 in FIG. 10) of the machine learning model. At block 1126, the machine learning model determines whether the chunk identifier with the highest ensemble score is equivalent to the training chunk that generated the query. In other words, one of the objectives in the process illustrated in FIG. 11 is to determine whether the machine learning model can correctly determine the training chunk that originally generated the query. In other words, the machine learning model is not presented with information regarding the training chunk. As stated previously, the goal for the machine learning model is to determine which chunk associated with the subset of one or more search results corresponds to the training chunk. At block 1128, the machine learning model adjusts the training weights based on the determination. In some embodiments, the machine learning model may have incorrectly determined that the chunk with the highest ensemble score is the training chunk. As such, the machine learning model may automatically adjust the training weights (e.g., after determining it was incorrect). For example, the adjustment may be performed with the assistance of a loss function (as explained below). In further embodiments, the machine learning model may adjust one training weight or a number of training weights less than the total number of training weights. In further embodiments, the machine learning model may have correctly determined that the chunk with the highest ensemble score is the training chunk. Therefore, the machine learning model may not necessarily need to adjust the training weights. At block 1130 the routine ends.

In some embodiments, a loss function is used to optimize the training process (e.g., re-ranking process). More specifically, the loss function quantifies a difference between the predictions of the machine learning model (e.g., ensemble model) and the actual target value (e.g., true label) in the training dataset (e.g., determine value that describes the difference between the predicted (incorrect) chunk identifier and the correct chunk identifier). The machine learning model is inherently optimized to minimize the prediction error. Therefore, after a determination of the loss value for the loss function (which is determined by the prediction error), the machine learning model uses this information to conduct weight and parameter updates which comes into effect during the next training pass or iteration.

For example, the routine 1100 may be performed iteratively with different training chunks in the training dataset (e.g., until all the training chunks in the training dataset have been selected), in which the trainable weights (e.g., first, second, third, etc.) being updated (e.g., at block 1128) each time (e.g., each time that the routine 1100 is performed) based on the loss value. In other words, the routine 1100 may be performed multiple times (e.g., performed using a different training chunk identifier obtained block 1104), in which a loss value (determined based on a loss function) is determined at block 1128. After determining the loss value, the trainable weights (e.g., first, second, third, etc.) are updated to ensure to increase the probability of a correct prediction next time.

Consequently, the use of a loss function leads to a lower prediction error. More specifically, the use of a loss function can cause the correct target value (e.g., chunk identifier) to move towards a higher position in the ranking (e.g., increase the probability that the correct chunk identifier is chosen next time). In another example, the loss value can be determined using a hinge loss function, which is defined as the maximum of (1) zero or (2) the difference between one and a product of the predicted y-value (that is not the true (or correct) label) and the true (correct) label. By minimizing the difference, the y-value at the true label effectively moves towards a higher position in the ranking. Examples of loss functions that can be used include, but are not limited to, mean square error (L2) loss, mean absolute error (L1) loss, binary cross-entropy loss, categorical cross-entropy loss, Huber (smith mean absolute error) loss, and log loss.

Figure 12:
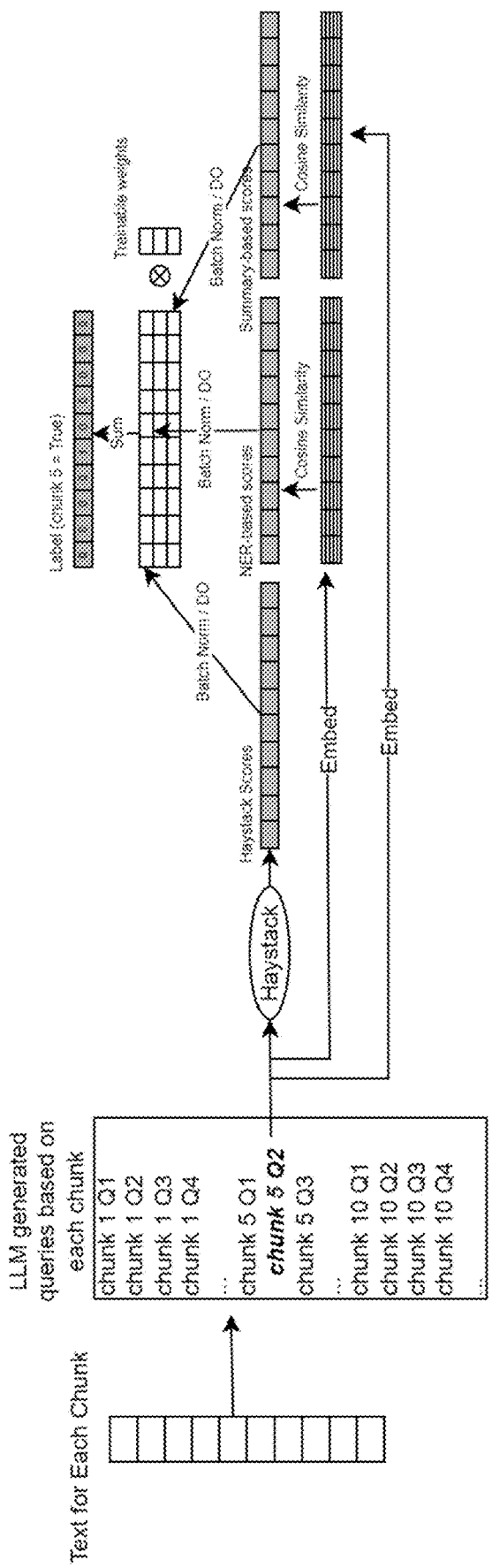
FIG. 12 is a diagram illustrating the architecture for training a machine learning model.

It should be noted that the process in FIG. 11 is also illustrated in portions of FIG. 12 (with slight modifications) that may be implemented in some embodiments. As shown in FIG. 12, a group of chunks (chunks 1-10) may be used for training the machine learning model (e.g., ensemble model in FIG. 10) included in the re-ranking module 110d. Each chunk in the group of chunks may have been modified according to an alteration technique. Further, embeddings of each chunk in the group of chunks may have also been generated. In the example illustrated in FIG. 12, the chunks have been pre-modified according to both an NER technique and a summarization technique. A query generating LLM (as discussed above with respect to FIG. 11) may be used to generate one or more queries (e.g., Q1-Q4) for each chunk of the group of chunks. One of the queries ("Q2") of one of the chunks ("chunk 5") may be used to train the machine learning model. As such, the query is transmitted to the Haystack framework, which generates Haystack scores. The query is also embedded (the concept of embedding is discussed in the description corresponding to FIG. 2). Next, the NER-based score is generated by performing a measurement function (e.g., cosine similarity) on the query and the embeddings of chunks in the group of chunks, and a summarization-based score is generated by performing a measurement function (e.g., cosine similarity) on the query and the embedding of chunks in the group of chunks. Further, as shown in FIG. 12, batch normalization ("BN") and/or dropout techniques ("DO") may also be incorporated into the ensemble model to increase accuracy (e.g., reduced overfitting) as discussed above.

Afterwards, the machine learning model generates ensemble scores for each of the chunks in the group of chunks. The ensemble scores may be generated based on the Haystack Scores, the NER-based scores, the summary-based scores, and the trainable weights provided by the machine learning model. In some embodiments, the machine learning model predicts (e.g., via its training and/or using machine learning techniques) the ensemble score for a specific chunk identifier based on the Haystack score, NER-based score, and summarization-based score for each chunk identifier. In other embodiments, the ensemble score for a specific chunk in the group of chunks is obtained by (1) first multiplying the Haystack score with a first trainable weight to generate a Haystack score product, multiplying the NER-based scores with a second trainable weight to generate an NER-based score product, and multiplying the summarization-based scores with a third trainable weight to generate a summarization-based score product, and then by (2) summing the Haystack score product, the NER-based score product, and the summarization-based score product to generate a weighted sum (e.g., the ensemble score). In this case, the highest ensemble score was determined to correspond to the correct chunk ("chunk 5"). In some embodiments, the training is performed for each query (e.g., Q1-Q4) of each of the group of chunks (e.g., chunks 1-10).

Execution Environment

FIG. 13 illustrates various components of an example computing device 1300 configured to implement various functionality described herein.

In some embodiments, the computing device 1300 may be implemented using any of a variety of computing devices, such as server computing devices, desktop computing devices, personal computing devices, mobile computing devices, mainframe computing devices, midrange computing devices, host computing devise, or some combination thereof.

In some embodiments, the features and services provide by the computing device 1300 may be implemented as webs services consumable via one or more communication networks. In further embodiments, the computing device 1300 is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 1300 may include one or more processors 1302, such as physical central processing units ("CPUs"); one or more network interfaces 1304, such as network interface cards ("NICs"); one or more computer readable medium drives 1306, such as a high density disk ("HDDs"), solid state drives ("SSDs"), flash drives, and/or other persistent computer readable media; one or more input/output drive interfaces 1308; and one or more computer-readable memories 1310, such as random access memory ("RAM") and/or other volatile non-transitory readable media.

The one or more computer-readable memories 1310 may include computer program instructions that one or more computer processors 1302 execute and/or data that the one or more computer processors 1302 use in order to implement one or more embodiment. For example, the one or more computer-readable memories 1310 can store an operating system 1312 to provide general administration of the computing device 1300. As another example, the one or more computer-readable memories 1310 can store a (large) language model(s) 1314 for processing natural language input and generating natural language output (e.g., machine learning store 114). In another example, the one or more computer-readable memories 1310 can store a chunk preprocessing system 1316 (e.g., chunk preprocessing system 112) for generating modifications of chunks and embeddings of such modifications of chunks. In yet another example, the one or more computer-readable memories 1310 can store a search framework 1318 (e.g., search framework 108), which includes a search engine for performing searches, and generates one or more first weight scores. In a further example, the one or more computer-readable memories 1310 can store a search enhancement system 1320 (e.g., search enhancement system 110), which obtains a subset of search results generated by the search framework 108, and performs a re-ranking of the subset of search results. In another example, the one or more computer-readable memories 1310 can store machine learning model(s) 1322 that may include machine learning model(s) other than a language model or a large language model (e.g., models stored or included in (large) language model(s) 1314).

Terminology

The term "model," as used in the present disclosure, can include computer-based models of any type and of any level of complexity, such as any type of sequential, functional, or concurrent model. Models can further include various types of computation models, such as, for example, artificial neural networks ("NN"), language models (e.g., large language models ("LLMs")), artificial intelligence ("AI") models, machine learning ("ML") models, multimodals (e.g., models or combinations of models that can accept inputs of multiple modalities, such as images and text), and/or the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language response based on the text on which the model is trained. A language model may include n-gram, exponential, positional, neural network, and/or other types of models.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise an NN trained using self-supervised learning. An LLM may be of any type, including a Question Answer ("QA") LLM that may be optimized for generating answers from a context, a multimodel LLM/model, and/or the like. An LLM (and/or other models of the present disclosure), may include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodel model, and/or other algorithmic process. Similarly, while certain aspects and implementations are discussed herein with reference to use of a ML model, those aspects and implementations may be performed any other AI model, generative AI model, generative model, NN, multimodel model, and/or other algorithmic processes.

In various implementations, the LLMs and/or other models (including ML models) of the present disclosure may be locally hosted, cloud managed, accessed via one or more Application Programming Interfaces ("API's"), and/or any combination of the foregoing and/or the like. Additionally, in various implementations, the LLMS and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (large Language Model Meta AI), and BigScience Large Open-science Open-access Multilingual Language Model (BLOOM).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for enhancing performance of a search engine, the system comprising a server computing device having a memory for storing computer executable instructions and a processor that executes the computer executable instructions to:

perform preprocessing on one or more chunks in a chunk database, the preprocessing comprising:

dividing a total number of sentences in each large chunk into two or more sentence sets, wherein each large chunk is a chunk that includes a total number of sentences that exceed a predetermined threshold, and wherein each sentence set includes one or more sentences; and generating, for each large chunk, a modified sentence set for each sentence set in the large chunk, wherein the modified sentence set is generated by modifying the respective sentence set according to an alteration technique associated with one or more alteration techniques;

receive search results from a search engine based on a query, in which the search results include chunk identifiers and a first weight score associated with each chunk identifier, wherein each chunk identifier corresponds to a chunk and one or more modified chunks, and wherein each of the one or more modified chunks are modified according to a different alteration technique;

determine a subset of search results, which includes a first predetermined number of top-ranked chunk identifiers in the search results that are determined by the search engine to be the most relevant to the query;

generate, for each chunk identifier in the subset of search results, one or more second weight scores based on an embedding of the query and embeddings of the one or more modified chunks corresponding to the chunk identifier, wherein a second weight score is generated for each modified chunk associated with the chunk, and wherein, in a case that the chunk associated with the chunk identifier is a large chunk, the one or more second weight scores are generated based on the embedding of the query and embeddings of one or more modified sentence sets corresponding to the large chunk;

generate, via a machine learning model, ensemble scores for the chunk identifiers, wherein each ensemble score for a chunk identifier is determined based on the first weight score, the one or more second weight scores, and trainable weights of the machine learning model; and determine a second predetermined number of top-ranked chunk identifiers based on the ensemble scores, wherein the second predetermined number is less than the first predetermined number.

2. The system of claim 1, wherein the preprocessing further comprises:

generating, for each chunk in the chunk database, one or more modified chunks according to one or more alteration techniques; and generating, for each of the one or more modified chunks, an embedding of a corresponding modified chunk, wherein the embedding is stored in an embedding database.

3. The system of claim 1, wherein each modified sentence set is grouped together into modified sentence groups based on a type of alteration technique used to generate the modified sentence set, and wherein an embedding associated with each modified sentence set is stored in an embedding database.

4. The system of claim 3, wherein each of the second weight scores, generated for the large chunk, corresponds to a modified sentence group, the second weight score for each modified sentence group being generated by:

determining a preliminary score for each modified sentence set in the modified sentence group; and selecting the preliminary score of a modified sentence set that has the highest value, wherein each preliminary score is generated based on the embedding of the query and an embedding of a corresponding modified sentence set.

5. The system of claim 1, wherein a user utilizes a search application on a computing device to generate the query for the search engine, and wherein the search application returns the search results to the user, in which the search application displays chunks corresponding to the second predetermined number of top-ranked chunk identifiers.

6. The system of claim 1, wherein at least one of the one or more alteration techniques is a named entity recognition (NER) technique, in which a large language model (LLM) uses the NER technique to generate an NER output that includes a list of one or more words that are determined to be named entities according to predetermined categories.

7. The system of claim 6, wherein the computer executable instructions cause the processor to perform further operations to:

modify the NER output by removing duplicates of the one or more words and arranging the one or more words according to their frequency; and embed the modified NER output.

8. The system of claim 1, wherein at least one of the one or more alteration techniques is a summarization technique, in which a large language model (LLM) is used to generate a summary of text.

9. The system of claim 1, wherein the search engine uses a Haystack framework to perform a search, and wherein the first weight scores are Haystack scores.

10. The system of claim 1, wherein the measurement function is used to determine the one or more second weight scores.

11. The system of claim 10, wherein the measurement function is at least one of cosine similarity, Euclidean distance, Jaccard distance, Manhattan distance, and Minkowski distance.

12. A computerized method for enhancing performance of a search engine, the method comprising:

performing preprocessing on one or more chunks in a chunk database, the preprocessing comprising:

dividing a total number of sentences in each large chunk into two or more sentence sets, wherein each large chunk is a chunk that includes a total number of sentences that exceed a predetermined threshold, and wherein each sentence set includes one or more sentences; and generating, for each large chunk, a modified sentence set for each sentence set in the large chunk, wherein the modified sentence set is generated by modifying the respective sentence set according to an alteration technique associated with one or more alteration techniques;

receiving search results from a search engine based on a query, in which the search results include chunk identifiers and a first weight score associated with each chunk identifier, wherein each chunk identifier corresponds to a chunk and one or more modified chunks, and wherein each of the one or more modified chunks are modified according to a different alteration technique;

determining a subset of search results, which includes a first predetermined number of top-ranked chunk identifiers in the search results that are determined by the search engine to be the most relevant to the query;

generating, for each chunk identifier in the subset of search results, one or more second weight scores based on an embedding of the query and embeddings of the one or more modified chunks corresponding to the chunk identifier, wherein a second weight score is generated for each modified chunk associated with the chunk, and wherein, in a case that the chunk associated with the chunk identifier is a large chunk, the one or more second weight scores are generated based on the embedding of the query and embeddings of one or more modified sentence sets corresponding to the large chunk;

generating, via a machine learning model, ensemble scores for the chunk identifiers, wherein each ensemble score for a chunk identifier is determined based on the first weight score, the one or more second weight scores, and trainable weights of the machine learning model; and determining a second predetermined number of top-ranked chunk identifiers based on the ensemble scores, wherein the second predetermined number is less than the first predetermined number.

13. The method of claim 12, further comprising:
generating, for each chunk in the chunk database, one or more modified chunks according to one or more alteration techniques; and
generating, for each of the one or more modified chunks, an embedding of a corresponding modified chunk, wherein the embedding is stored in an embedding database.

14. The method of claim 12, wherein each modified sentence set is grouped together into modified sentence groups based on a type of alteration technique used to generate the modified sentence set, and wherein an embedding associated with each modified sentence set is stored in an embedding database.

15. The method of claim 14, wherein each of the one or more second weight scores, generated for the large chunk, corresponds to a modified sentence group, the second weight score for each modified sentence group being generated by:
determining a preliminary score for each modified sentence set in the modified sentence group; and
selecting the preliminary score of a modified sentence set that has the highest value, wherein each preliminary score is generated based on the embedding of the query and an embedding of a corresponding modified sentence set.

16. The method of claim 12, wherein a user utilizes a search application on a computing device to generate the query for the search engine, and wherein the search application returns the search results to the user, in which the search application displays chunks corresponding to the second predetermined number of top-ranked chunk identifiers.

17. The method of claim 12, wherein at least one of the one or more alteration techniques is a named entity recognition (NER) technique, in which a large language model (LLM) uses the NER technique to generate an NER output that includes a list of one or more words that are determined to be named entities according to predetermined categories.

18. The method of claim 17, further comprising:
modifying the NER output by removing duplicates of the one or more words and arranging the one or more words according to their frequency; and
embedding the modified NER output.

19. The method of claim 12, wherein at least one of the one or more alteration techniques is a summarization technique, in which a large language model (LLM) is used to generate a summary of text.

20. The method of claim 12, wherein the search engine uses a Haystack framework to perform a search, and wherein the first weight scores are Haystack scores.

21. The method of claim 12, wherein the measurement function is used to determine the one or more second weight scores.

22. The method of claim 21, wherein the measurement function is at least one of cosine similarity, Euclidean distance, Jaccard distance, Manhattan distance, and Minkowski distance.

* * * * *